United States Patent
Wang Helmersson et al.

(10) Patent No.: US 10,512,093 B2
(45) Date of Patent: Dec. 17, 2019

(54) SERVICE-SPECIFIC SCHEDULING IN CELLULAR NETWORKS

(71) Applicant: Telefonaktiebolaget LM Ericsson (publ), Stockholm (SE)

(72) Inventors: Ke Wang Helmersson, Linköping (SE); Nadia Brahmi, Hildesheim (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 96 days.

(21) Appl. No.: 15/501,585

(22) PCT Filed: Apr. 1, 2015

(86) PCT No.: PCT/EP2015/057240
§ 371 (c)(1),
(2) Date: Feb. 3, 2017

(87) PCT Pub. No.: WO2016/155823
PCT Pub. Date: Oct. 6, 2016

(65) Prior Publication Data
US 2017/0230984 A1  Aug. 10, 2017

(51) Int. Cl.
*H04W 72/08* (2009.01)
*H04W 72/12* (2009.01)

(52) U.S. Cl.
CPC ..... *H04W 72/082* (2013.01); *H04W 72/1231* (2013.01); *H04W 72/12* (2013.01)

(58) Field of Classification Search
None
See application file for complete search history.

(56) References Cited

U.S. PATENT DOCUMENTS

| | | |
|---|---|---|
| 6,728,544 B1 | 4/2004 | Boyer et al. |
| 8,310,986 B1 | 11/2012 | Gormley et al. |
| 8,442,002 B2 | 5/2013 | Zhou et al. |
| 2010/0220648 A1* | 9/2010 | Persson .................. H04L 47/10 370/328 |
| 2010/0317364 A1 | 12/2010 | Zhang et al. |
| 2014/0248890 A1* | 9/2014 | Amirijoo .............. H04L 5/0037 455/450 |
| 2014/0254392 A1* | 9/2014 | Wolcott ................ H04W 24/08 370/242 |
| 2014/0269545 A1 | 9/2014 | Galeev et al. |
| 2014/0269605 A1* | 9/2014 | Pecen .................. H04W 56/00 370/330 |

FOREIGN PATENT DOCUMENTS

| | | |
|---|---|---|
| WO | 2013055262 A1 | 4/2013 |
| WO | 2013061162 A2 | 5/2013 |

* cited by examiner

*Primary Examiner* — Christine T Duong
(74) *Attorney, Agent, or Firm* — Sage Patent Group

(57) ABSTRACT

Based on a service associated with data, a service-specific level of interference threshold (460) of the service is established and further a level of interference value (200) present on a radio interface of a cellular network is established. Based on the established level of interference threshold (460) and further based on the established level of interference value (200), it is selected between a predetermined first allocation scheme (491, 492) of radio resources on the radio interface and a predetermined second allocation scheme (491, 492) of radio resources on the radio interface.

21 Claims, 12 Drawing Sheets

SERVICE-SPECIFIC SCHEDULING IN CELLULAR NETWORKS

TECHNICAL FIELD

Various embodiments relate to a method of transmitting data on a radio interface of a cellular network, a device, and a method of resource allocation. In particular, various embodiments relate to techniques of service-specific resource allocation.

BACKGROUND

Mobile radio technology has experienced a number of generation changes. These generation changes have transformed the cellular landscape into a global set of interconnected networks. It is expected that by the year 2020, cellular networks will support various applications including voice, video, and a complex range of communication services; support is expected for more than 9 billion subscriptions and billions of connected devices.

To account for such increasing the amount on network operability, the third generation partnership project (3GPP) aims to release the next generation of radio access technology, sometimes referred to as 5G. 5G is a set of evolved network technology. 5G intends to provide additional frequency bands and technologies that allow sharing the available frequency spectrum. By this, it is intended to provide new types of applications and services to the users; in particular, industrial applications are envisioned.

Generally, next generation cellular networks are expected to provide efficient support of application with widely varying operational parameters to provide greater flexibility in deploying services and to meet more and more complex performance requirements.

Use cases of communication are transitioning from a person-to-person model to anything-to-anything and anywhere. Cellular networks are expected not only to support communication between individuals, but also communication between objects and things. In particular, communication between devices and sensors is a relevant use case. Such a scenario is often referred to a machine type communication (MTC).

For MTC applications, comparably strict requirements with respect to service availability and reliability are expected. In particular, it is expected that near-zero latency communication is required.

On the other hand, as mentioned above, the number of devices attached to the cellular network is expected to increase even further. This can require to more efficiently utilizing the available spectrum. Increasing capacity and meeting traffic demands is expected to require frequency re-use (frequency sharing). Frequency re-use corresponds to a scenario where communication devices located in neighboring cells of the cellular network transmit data in the same frequency band. However, employing frequency re-use inevitably leads to an increase in the interference level present on the radio interface of the cellular network. In particular, inter-cell interference between neighboring cells is considered to increase. The considerable interference level, on the other hand, can cause problems when seeking to fulfill the above-mentioned requirements with respect to service availability, reliability, and latency. Inter-cell interference is expected to be the dominant source of performance impairment.

To avoid such performance impairment due to frequency re-use, different techniques have been considered. E.g., so-called fractional or soft frequency re-use has been proposed. In such techniques, users are categorized into cell-edge users and cell-center users. Here, cell-center users employ frequency re-use—while cell-edge users transmit on separate frequencies. The categorization of users is based on the location of the user.

However, such techniques face certain restrictions and drawbacks. In particular, while such reference implementations can effectively mitigate interference to fulfill average user performance, a combination of, both, high reliability and low latency is not achievable or only achievable to a limited degree. Further, such techniques cannot be readily applied to MTC scenarios where the coverage area of a cell is comparably small, e.g. in the order of only a few hundred meters. Therefore, soft frequency re-use may not be readily applied for factory automation.

SUMMARY

Therefore, a need exists for advanced techniques of scheduling in a cellular network. In particular, a need exists for scheduling techniques that allow employing, both, efficient re-use of resources on the radio interface, as well as strict service requirements such as low latency, high transmission reliability, and a continuous availability. Further, a need exists for techniques that can be applied to MTC scenarios.

This need is met by the features of the independent claims. The dependent claims define embodiments.

According to an aspect, a method of transmitting data on a radio interface of a cellular network is provided. The method comprises establishing a service-specific level of interference threshold of the service and further establishing a level of interference value present on the radio interface, based on a service associated with the data. The method further comprises, based on the established level of interference threshold and further based on the established level of interference value, selecting between a predetermined first allocation scheme of radio resources on the radio interface and a predetermined second allocation scheme of radio resources on the radio interface. The method further comprises transmitting the data on the radio interface employing radio resources indicated by the selected one of the first allocation scheme and the second allocation scheme.

According to a further aspect, a device is provided. The device comprises an interface configured to transmit data via a radio interface of a cellular network. The device further comprises at least one processor. The at least one processor is configured to establish, based on a service associated with the data, a service-specific level of interference threshold of the service and further configured to establish a level of interference value present on the radio interface. The at least one processor is further configured to select between a predetermined first allocation and a predetermined second allocation scheme of radio resources on the radio interface. Said selecting is based on the established level of interference threshold and further based on the established level of interference value. The at least one processor is configured to transmit the data on the radio interface employing radio resources indicating by the selected one of the first allocation scheme and the second allocation scheme.

According to a further aspect, a method of resource allocation is provided. The method comprises, for each one of the plurality of services for which data transmission on a radio interface of a cellular network is available: determining a first allocation scheme of radio resources on the radio interface and a second allocation scheme of radio resources on the radio interface. The first allocation re-uses radio resources on the radio interface between a first cell and a second cell of the cellular network. The method further comprises, for each one of the plurality of services and for at least one of the first allocation scheme and the second allocation scheme: determining a level of interference value between the first cell and the second cell. The method further comprises, for at least one of the plurality of services: based on the determined level of interference value and further based on a service-specific quality of service requirement of the respective service, determining a service-specific level of interference threshold of the respective service. The service-specific level of interference threshold is suited to be used as decision criterion for selecting between the first allocation scheme and the second allocation scheme prior to transmitting the data of the respective service on the radio interface.

According to a further aspect, a device is provided. The device comprises at least one processor configured to execute, for each one of a plurality of services for which data transmission on a radio interface of a cellular network is available: determining a first allocation scheme of radio resources on the radio interface and a second allocation scheme of radio resources on the radio interface, the first allocation scheme re-using radio resources on the radio interface between a first cell and a second cell of the cellular network; for at least one of the first allocation and the second allocation scheme, determining a level of interference value between the first cell and the second cell; and, based on the determined level of interference value and further based on a service-specific quality of service requirement of the respective service, determining a service-specific level of interference threshold of the respective service. The service-specific level of interference threshold is suited to be used as decision criterion for selecting between the first allocation scheme and the second allocation scheme prior to transmitting the data of the respective service on the radio interface.

According to a further aspect, a computer program product is provided. The computer program product comprises program code to be executed by at least one processor of a device. Execution of the program code causes the least one processor to execute a method comprising, for each one of a plurality of services for which data transmission on a radio interface of a cellular network is available: determining a first allocation scheme of radio resources on the radio interface and a second allocation scheme of radio resources on the radio interface, the first allocation scheme re-using radio resources on the radio interface between a first cell and a second cell of the cellular network; and for at least one of the first allocation scheme and the second allocation scheme, determining a level of interference value between the first cell and the second cell; and, based on the determined level of interference value and further based on a service-specific quality of service requirement of the respective service, determining a service-specific level of interference threshold of the respective service. The service-specific level of interference threshold is suited to be used as decision criterion for selecting between the first allocation scheme and the second allocation scheme prior to transmitting the data of the respective service on the radio interface.

E.g., the computer program product according to the present aspect may comprise a tangible medium storing the program code.

According to a further aspect, a computer program product is provided. The computer program product comprises program code to be executed by at least one processor of a device. Execution of the program code causes the least one processor to execute a method of transmitting data on a radio interface of a cellular network. The method comprises establishing a service-specific level of interference threshold of the service and further establishing a level of interference value present on the radio interface, based on a service associated with the data. The method further comprises, based on the established level of interference threshold and further based on the established level of interference value, selecting between a predetermined first allocation scheme of radio resources on the radio interface and a predetermined second allocation scheme of radio resources on the radio interface. The method further comprises transmitting the data on the radio interface employing radio resources indicated by the selected one of the first allocation scheme and the second allocation scheme.

E.g., the computer program product according to the present aspect may comprise a tangible medium storing the program code.

According to a further aspect, a device is provided. The device comprises means to transmit data via a radio interface of a cellular network. The device further comprises means for establishing, based on a service associated with the data, a service-specific level of interference threshold of the service. The device further comprises means for establishing a level of interference value present on the radio interface. The device further comprises means for selecting between a predetermined first allocation scheme of radio resources on the radio interface and a predetermined second allocation scheme of radio resources on the radio interface, said selecting being based on the established level of interference threshold and further being based on the established level of interference value. The device further comprises means for transmitting the data on the radio interface employing radio resources indicated by the selected one of the first allocation scheme and the second allocation scheme.

According to a further aspect, a device is provided. The device comprises means for determining, for each one of a plurality of services for which data transmission on a radio interface of a cellular network is available, a first allocation scheme of radio resources on the radio interface and a second allocation scheme of radio resources on the radio interface. The first allocation scheme re-uses radio resources on the radio interface between a first cell and a second cell of the cellular network. The device further comprises means for determining, for each one of the plurality of services and for at least one of the first allocation scheme and the second allocation scheme, a level of interference value between the first cell and the second cell. The device further comprises means for determining, for each one of the plurality of services and based on the determined level of interference value and further based on a service-specific quality of service requirement of the respective service, a service-specific level of interference threshold of the respective service. The service-specific level of interference threshold being suited to be used as a decision criterion for selecting between the first allocation scheme and the second allocation scheme prior to enabling transmission of data of the respective service on the radio interface.

It is to be understood that the features mentioned above and features yet to be explained below can be used not only in the respective combinations indicated, but also in other combinations or in isolation, without departing from the scope of the present invention. Features of the above-mentioned aspects and embodiments may be combined with each other in other embodiments.

BRIEF DESCRIPTION OF THE DRAWINGS

The foregoing and additional features and effects of the invention will become apparent from the following detailed description when read in conjunction with the accompanying drawings, in which like reference numerals refer to like elements.

DETAILED DESCRIPTION OF EMBODIMENTS

Figure 1:
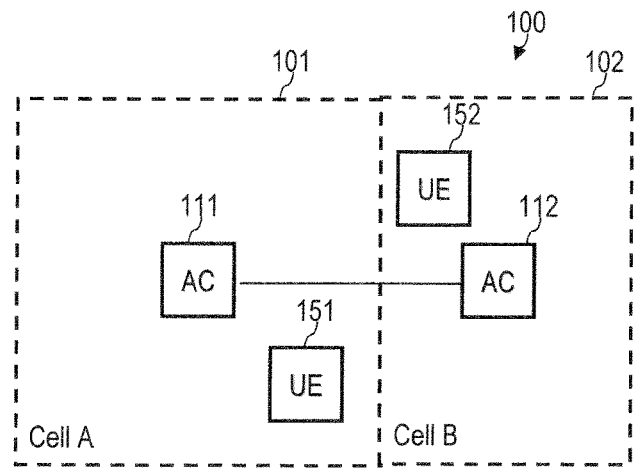
FIG. 1 is a schematic illustration of a cellular network comprising a first cell and an adjacent second cell, wherein a first communication device is located in the first cell, and wherein a second communication device is located in the second cell.

In the following, embodiments of the invention will be described in detail with reference to the accompanying drawings. It is to be understood that the following description of embodiments is not to be taken in a limiting sense. The scope of the invention is not intended to be limited by the embodiments described hereinafter or by the drawings, which are taken to be illustrative only.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Hereinafter, techniques will be described that enable to prospectively determine allocation schemes for radio resources on a radio interface of a cellular network. The allocation schemes are determined in a service-specific manner, e.g., it is possible to predetermine different allocation schemes for different services. Different allocation schemes can correspond to: employing different resources and/or employing different re-using schemes of resources. Re-using of radio resources can correspond to communication devices (UEs) in neighboring cells transmitting data in the same time-frequency resource blocks. This allows optimizing a trade-off situation between re-using of radio resources between different communication devices (UEs) on the one hand and, on the other hand, fulfilling service requirements of a service for which data needs to be transmitted.

In particular, techniques are illustrated that define metrics to determine under what signal-to-noise (SNR) conditions service requirements are met and subsequently allow adjusting a degree of re-using radio resources. These metrics can yield a SNR, or, more specifically, a signal-to-interference-and-noise ratio (SINR). The SNR or specifically the SINR can be used during network operation as a decision criterion for selecting between the different predetermined scheduling schemes.

Typically, the SNR considers the signal of a channel of the cellular network on which data is transmitted at a location of a UE and further considers noise; the signal and the noise are set in relation. For the SINR, typically different specific contributions to the noise are considered; for example, the noise can comprise background noise and/or interference, i.e., noise generated by another channel of the cellular network. In particular, the interference can correspond to inter-cell interference.

Techniques as explained hereinafter may find application in various cellular networks and different kinds of radio access technology. One particular scenario is employing these techniques for MTC networks. In such a scenario, typically the service requirement and coverage requirement are comparatively strict. Techniques according to various embodiments can also be applied to scenarios where the service requirements are more relaxed if compared to MTC networks. Such techniques may be applicable to different types of radio access technologies such as 3GPP Long Term Evolution (LTE), 3GPP Universal Mobile Telecommunications System (UMTS), etc.

These techniques, in particular, allow for efficient utilization of the radio resources by employing re-using of radio resources for UEs located in different cells—while, at the same time, it is possible to ensure that quality of service (QoS) requirements are fulfilled. In particular, such techniques may be applied to a wide range of QoS requirements such as latency, availability, reliability of transmission. Reliability of transmission may be expressed in terms of bit error rate (BER) and/or block error rate (BLER); latency may be expressed in terms of a maximum allowable delay, a mean delay, etc. Availability may be expressed in terms of average downtime per time interval, etc.

Generally, re-using of the radio resources as explained hereinafter may relate to re-using the radio resources in time domain and/or frequency domain. Re-using radio resources in time domain typically requires coordinated scheduling (co-scheduling) between neighboring cells of the cellular network; here, co-scheduling may occur such that the same or different timeslots are employed for transmission of data in a given frequency band. Co-scheduling may require time synchronization between access nodes in neighboring cells; respective control signaling might be required. Where no co-scheduling is required, UEs in neighboring cells may be scheduled independently with respect to each other, i.e., autonomously. Where radio resources are re-used in frequency, it is possible that different UEs located in neighboring cells transmit in the same frequency band or at least in partially overlapping frequency bands.

Generally, re-using of radio the radio resources can occur in uplink (UL) transmission and/or downlink (DL) transmission. Depending on the scenario, the interference may be caused by a static interferer that does not change its position over time; and/or by a mobile interferer that changes its position over time. Examples for a static interferer include access nodes and UEs which do not change their position such as UEs build into a fixedly installed machine. Examples for mobile interferer comprise non static UEs. In a typical scenario, DL transmission will be subject to inter-cell interference from a static interferer, namely the access node of a neighboring cell, and UL transmission will be subject to inter-cell interference from a mobile interferer, namely one or more UEs in the neighboring cell.

As mentioned above, the techniques can be applied in a wide variety of cellular networks that offer possibilities of re-using radio resources between different cells. FIG. 1 illustrates an example topology of a cellular network 100 where such techniques may be employed. The cellular network 100 of FIG. 1 is a MTC network. The cellular network 100 comprises a first cell 101 having a size of 200 meters×200 meters and a second cell 102 having a size of 200 meters×100 meters; the first cell 101 coincides with a first room; the second cell 102 coincides with a second room. The first cell 101 is defined by a first access node 111 located in the center of the first cell 101; the second cell 102 is defined by a second access node 112 located in the center of the second cell 102. The first UE 151 is located in the first cell and a second UE 152 is located the second cell. The location of the UEs 151, 152 within the cells 101, 102 may change over the course of time. Then, the UE 151 in the first cell 101 will experience different SINRs depending on its locations. As mentioned above, the interference may originate from a static interferer, i.e., the access node 112 in the second cell 102, and/or from a mobile interferer, i.e., the UE 152 in the second cell 102.

Figure 2:
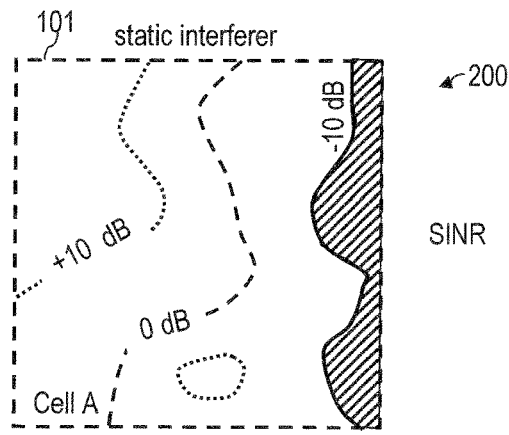
FIG. 2 is a contour plot of a signal-to-interference-and-noise level in the first cell.

Referring to FIG. 2, an example scenario of different SINR levels throughout the first cell 101 are plotted. Such a scenario may be typical for a static interferer. In FIG. 2, the static interferer is the access node 112 of the second cell 102. Generally, the inter-cell interference as illustrated in FIG. 2 can occur in UL transmission and/or DL transmission, depending on how bandwidth usage is distributed between UL transmission and DL transmission in the first and second cells 101, 102, respectively. Further, in the scenario FIG. 2, the first access node 111 and the second access node 112 autonomously schedule transmission via the radio interface. I.e., the first access node 111 autonomously schedules radio resources for the UE 151; likewise, the second access node 112 autonomously schedules radio resources for the UE 152.

FIG. 2 plots the SINR 200 for different locations of the UE 151 within the first cell 101. While background noise may be present throughout the first cell 101, as can be seen from FIG. 2, the interference is particularly high close to the edge of the first cell 101 bordering the second cell 102 (which corresponds to a low value of the SINR 200). This is because frequency re-using is employed. About 20% of all locations within the first cell 101 exhibit a SINR 200 that is below −10 dB (illustrated in FIG. 2 by the filled dashed area).

Generally, it is also possible to obtain the SINR 200 levels for the first cell 101 for a mobile interferer in the second cell 102 (not shown in FIG. 2). This may involve assumptions regarding a mobility of the mobile interferers, e.g., a likelihood that mobile interferers are encountered at a given location within the second cell 102, etc.

Above, with respect to FIG. 2, inter-cell interference in the first cell 101 due to the access node 112 being a static interferer has been discussed. With respect to FIG. 3, inter-cell interference with respect to a mobile interferer is considered. Typically, such a scenario may occur for UL transmission where UE 151 and UE 152 send data in the same frequency bands.

Figure 3:
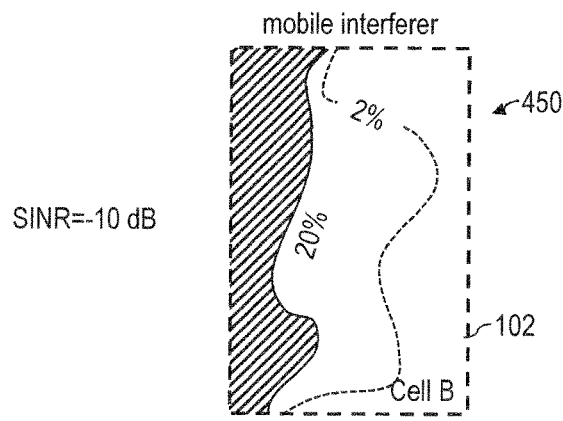
FIG. 3 is a contour plot illustrating an influence on the signal-to-interference-and-noise of UEs located in the first cell and caused by communication devices located in the second cell, wherein the influence on the signal-to-interference-and-noise is illustrated with respect to communication devices of the first cell associated with different cell-edge percentiles.

In detail, it is possible to determine which locations within the second cell 102 contribute to the inter-cell interference of the SINR 200 at a given location within the first cell 101. This is illustrated in FIG. 3. Here, for different cell-edge percentiles 450 of the first cell 101, areas are indicated where the resulting SINR 200 of the corresponding UEs 151 in the first cell 101 falls below a certain threshold—e.g., −10 dB—, because the inter-cell interference caused by UEs 152 located in the second cell in the indicated areas is comparably large—i.e., those UEs 152 located in the corresponding areas in the second cell 102 cause inter-cell interference. E.g., considering those locations within the first cell 101 that have 80% highest SINRs 200 (i.e., above the 20th cell-edge percentile): the area depicted left of the full line in FIG. 3 (illustrated in FIG. 3 by the filled dashed area) causes inter-cell interference above a certain threshold; differently, the area depicted on the right side of the full line does not significantly cause inter-cell interference for the UEs 151 in the first cell 101 above the 20th cell-edge percentile.

Figure 4:
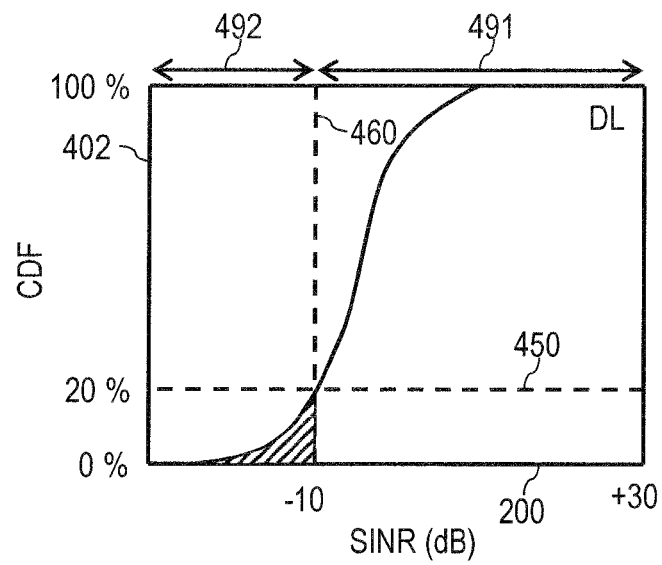
FIG. 4 plots the accumulated distribution within the first cell of signal-to-interference-and-noise values in the first cell in the case of frequency re-using between the first cell and the second cell.
Figure 5:
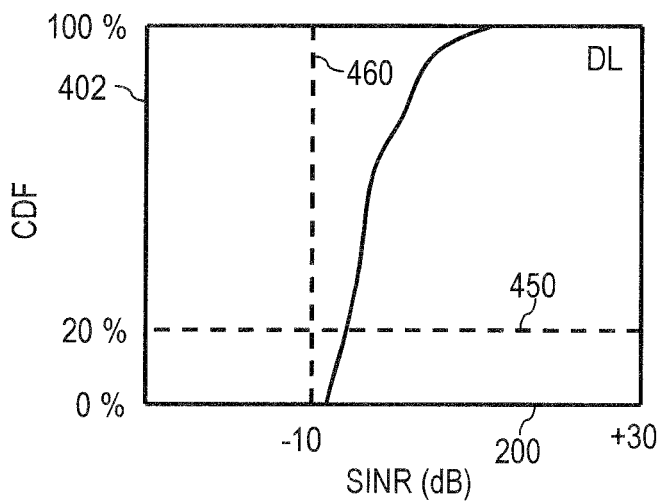
FIG. 5 plots the accumulated distribution within the first cell of signal-to-interference-and-noise values in the first cell in case first and second resource allocation scheme according to various embodiments are employed, wherein the first resource allocation scheme employs frequency re-using, and wherein the second resource allocation scheme does not employ frequency re-using.
Figure 6:
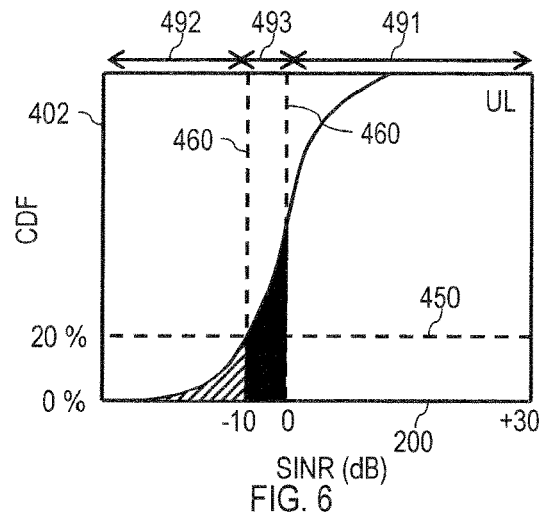
FIG. 6 plots the accumulated distribution within the first cell of signal-to-interference-and-noise values in the first cell in the case of frequency re-using between the first cell and the second cell.
Figure 7:
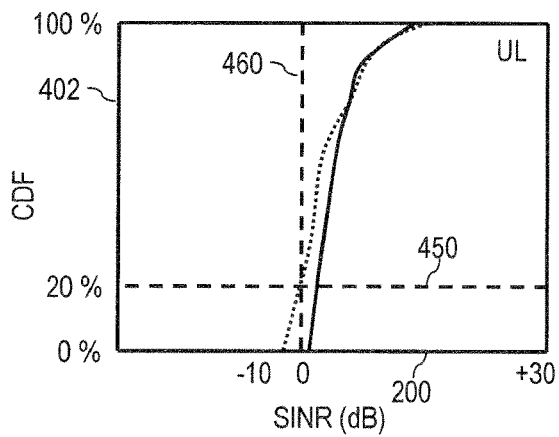
FIG. 7 plots the accumulated distribution within the first cell of signal-to-interference-and-noise values in the first cell in case first, second, and third resource allocation scheme according to various embodiments are employed, wherein the first resource allocation scheme employs frequency re-using, wherein the second resource allocation scheme does not employ frequency re-using, and wherein the third resource allocation scheme employs frequency re-using and further employs co-scheduling of communication devices located in the first cell and the second cell.
Figure 8:
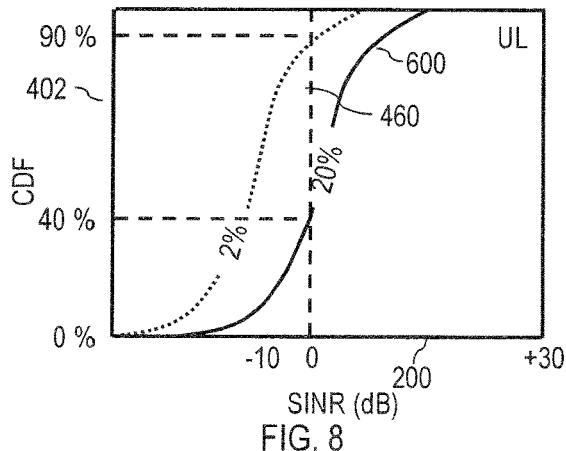
FIG. 8 plots the accumulated distribution within the second cell of signal-to-interference-and-noise values of communication devices in the first cell and caused by communication devices in the second cell for communication devices located in the first cell at different cell-edge percentiles.

For sake of simplicity, with respect to the following FIGS. 4-8 it is now assumed that the inter-cell interference of a static interferer corresponds to DL transmission (FIGS. 4 and 5) and that the inter-cell interference of a mobile interferer corresponds to UL transmission (FIGS. 6-8). I.e., for DL transmission the access nodes 111, 112 send in the same frequency bands; likewise, for UL transmission the UEs 151, 152 send in the same frequency bands. This is an example configuration only. Different usage of the spectrum is possible leading to different interference scenarios.

FIG. 4 is an example of the cumulative distribution function (CDF) 402 of the scenario of FIG. 2. In FIG. 4, those locations that exhibit an SINR below −10 dB are highlighted (illustrated in FIG. 4 by the filled dashed area). 20% (80%) of the UEs 151 located in the first cell 101 have a SINR 200 below (above)—10 dB. The corresponding cell-edge percentile 450 is illustrated; here it is assumed that a transmission quality metric used to determine the cell-edge percentile 450 is based on the SINR 200. Generally, transmission quality metrics used to define the cell-edge percentile 450 are not limited to the SINR 200; however, hereinafter, for sake of simplicity and for illustrative purposes, it is assumed that the transmission quality metric for the cell-edge percentile and is the SINR 200. Those UEs 151 located in the first cell 101 above the 20th cell-edge percentile 450 experience inter-cell interference only from those UEs 152 located in the dashed area of the second cell 102 in FIG. 3; UEs 152 located outside the dashed area do not cause significant inter-cell interference.

Data of FIGS. 2-4 is determined assuming that frequency re-using is employed in the entire cell. I.e., in a rough approximation it is assumed that all UEs 151 in the first cell 101 transmit in frequency bands also employed by the UEs 152 in the second cell 102. Hence, the data is based on a first allocation scheme 491 that employs frequency re-using between the first cell 101 and the second cell 102 and autonomously schedules the UEs 151, 152 located in the first and second cells 101, 102.

In the framework of the above-mentioned rough approximation of the first allocation scheme 491 being used homogeneously throughout the first cell 101, is now assumed that the SINR of −10 dB corresponds to a level of interference threshold 460 for which QoS requirements of data of a given service can just be fulfilled. I.e., for those 20% of the locations within the first cell 101 that exhibit and SINR below the threshold 460, transmission employing the first allocation scheme 491 cannot ensure that the corresponding service requirements are fulfilled. Generally, the service requirements could be defined, as explained above, using different metrics such as the reliability in terms of a specific BLER. Such a metric can then be translated into the level of interference threshold 460. Here, it can be required for a user, in order to support the corresponding service in the deployed areas, that the SINR 200 is above the level of interference threshold 460 independent of the location within the first cell 101. This is achieved by selecting a second allocation scheme 492 if a value of the SINR 200 falls below the level of interference threshold 460 of −10 dB, e.g., a current value of the SINR 200.

In detail, according to various embodiments, it is possible to determine the first allocation scheme 491 and the second allocation scheme 492, i.e., specify corresponding time-frequency resource blocks that either employ or do not employ re-using of resources. In simple scenarios, it is possible to determine all time-frequency resource blocks that reside within a given frequency band or correspond to a given frequency; i.e., in a simple scenario it is possible not to distinguish in time domain. Where a higher accuracy is need—such as typically may be the case for a mobile interferer in UL transmission—it is also possible to distinguish the time-frequency resource blocks in time domain. It is possible that only the first allocation scheme 491 re-uses radio resources on the radio interface between the first cell 101 and the second cell 102; the second allocation scheme 492 does not re-use radio resources between the first cell 101 and the second cell 102.

Generally, it is possible that different allocation schemes employed 491, 492 employ different time-frequency resource blocks for UL transmission and/or DL transmission. The different allocation schemes 491, 492 can allocate resources that do not overlap.

As mentioned above, in the scenario of FIGS. 2-4, the SINR 200 has been determined for the first allocation scheme 491 as the rough approximation. E.g. from FIG. 4 it can be seen that the service requirements cannot be fulfilled for this rough approximation, i.e., if first allocation scheme 491 was to be uniformly applied throughout the first cell 101. Thus, hereinafter techniques are illustrated which allow to refine the rough approximation and provide better results that allow to fulfill the required service requirements in the entire first cell 101.

In detail, based on the SINR 200 and further based on the level of interference threshold 460, it is possible to judge that for all UEs 151 within the first cell 101 that have a SINR 200 below the level of interference threshold 460, the second allocation scheme 492 should be employed. The second allocation scheme 492 does not re-use radio resources between the first cell 101 and the second cell 102. I.e., the second allocation scheme 492 does not share frequency bands between the first cell and the second cell 102. Because the second allocation scheme 492 does not rely on frequency re-using, it is further not required to co-schedule transmission in the first cell 101 and in the second cell 102 as the inter-cell interference is low anyway.

In FIG. 5, the CDF 402 is illustrated for this scenario, i.e., a scenario where the second allocation scheme 492 is chosen if the SINR 200 falls below −10 dB, i.e., the level of interference threshold 460. Then, the SINR 200 is above the level of interference threshold 460 for all locations in the first cell 101—however, at the same time frequency re-using is employed for 80% of the area of the first cell 101 which is favorable in terms of bandwidth usage. Thus, based on the SINR 200 it is possible to tailor the areas of the first cell 101 where frequency re-using is employed and where separate frequencies are required. Separate frequencies are required where the SINR 200 falls below the level of interference threshold 460.

As can be seen from the above, according to various embodiments techniques are provided which allow efficiently determining the decision criterion for selecting between the first allocation scheme 491 and the second allocation scheme 492, i.e., between employing re-using of resources and not employing re-using of resources. Generally speaking, it is possible that the SINR 200 is determined for at least one of the first allocation scheme 491 and the second allocation scheme 492, e.g., for different locations throughout the first cell 101. Then, it is possible to determine the level of interference threshold 460 based on the determined SINR 200 and the QoS requirements of the corresponding service. Namely, the level of interference threshold 460 can be determined such that re-using of resources by employing the first allocation scheme 491 can be enabled for the largest possible area of the first cell 101—while, at the same time, it is ensured that the service requirements are fulfilled throughout the entire first cell 101.

From the above it is apparent that by appropriately selecting the level of interference threshold 460, the trade-off between QoS on the one hand and re-using of radio resources on the other hand can be optimized in a service-specific manner. Thus, according to various embodiments, it is possible that a corresponding level of interference threshold 460 is determined for each one of the plurality of services for which data transmission on the radio interface of the cellular network 100 is possible. Because different services can have different QoS requirements, it is possible to individually optimize the above-mentioned trade-off for each service. In particular, it is possible to flexibly treat different services so that the overall user experience is optimized. An even larger degree service-specific tailoring can be achieved if—in addition to selecting the level of interference threshold 460 individually for each service—also the allocation schemes 491, 492 are determined individually for each service. It is, however, also possible that the same allocation schemes 491, 492 are used for a plurality of services in combination with service-specific level of interference thresholds 460.

Generally, it is possible that the above-mentioned techniques of determining the first allocation scheme 491, the second allocation scheme 492, and the level of interference thresholds 460 for the different services are part of a configuration mode. For example, it is possible that the configuration mode is executed prior to a need of transmitting data on the radio interface, i.e., prior to Showtime (network operation). Hence, it is possible that the configuration mode is executed during planning phase of network deployment or during maintenance of a deployed network. It is then possible to send a configuration message to the UEs 151, 152. The configuration message indicates the first allocation scheme 491, the second allocation scheme 492, and the level of interference thresholds 460 associated with the plurality of services. Hence, it is possible to pre-provision the different allocation schemes 491, 492 and the decision criteria for selecting between the different allocation schemes 491, 492; during network operation, it is possible to use these pre-provisioned or predetermined allocation schemes 491, 492; this reduces computational efforts required during Showtime and accelerates network operation.

Above, techniques have been discussed where, based on the SINR 200, it is possible to determine the decision criterion for selecting between the first allocation scheme 491 and the second allocation scheme 492. Generally, it is possible that the SINR 200 is determined based on measurements. For example, the SINR 200 can be determined based on a control message received from one of the UEs 151, 152 and indicating the SINR 200 at the location of the respective UE 151, 152. E.g., the control message indicating the SINR 200 can be a channel quality indicator (CQI). Alternatively or additionally, it is also possible to determine the SINR 200 based on propagation models, i.e., by simulation or numerical evaluation or analytic calculation. Generally speaking, the SINR 200 can be determined based on a model-based performance metric yielding a distribution of SINR 200 values such as the above mentioned CDF 402. The distribution 402 can specify the SINR 200 for different locations at least in the first cell 101. The model-based performance metric can consider a spatial geometry of the first cell 101 and the second cell 102. Hence, it is possible to estimate the expected SINR 200 in a network to be deployed in a computer-assisted manner. For example, the model based performance metric can consider a spatially resolved path-gain model between any pair of locations the first cell 101 and the second cell 102 to determine an interference contribution to the SINR 200. In a comparable manner, it is possible that the model-based performance metric considers a cell-edge user throughput criterion to determine a signal contribution of the SINR 200; here, it can be assumed that the SINR 200 of a given UE 151, 152 is above/below a certain cell-edge percentile and the signal contribution to the SINR 200 can be derived from this assumption. For such techniques, numerical simulations may be employed based on a grid map covering the deployment area of the cellular network 100. The grid map may have a specific resolution. Interpolation may be required to increase the resolution of the grid map depending on the desired accuracy.

As mentioned above, the first allocation scheme 491 employs re-using of radio resources on the radio interface; differently, the second allocation scheme 492 does not implement re-using of radio resources. E.g., with respect to the scenarios discussed above, it is possible that the first allocation scheme 491 employs re-using of radio resources in frequency. Thus, it is possible that the first allocation scheme 491 allocates a common frequency band to radio resources on the radio interface for the data transmission in the first cell 101 and the second cell 102. Differently, the second allocation scheme 492 allocates at least partly different frequency bands to radio resources on the radio interface for the data transmission in the first cell 101 and in the second cell 102. It is also possible that the second allocation scheme 492 allocates non-overlapping frequency bands to radio resources on the radio interface for the data transmission in the first cell 101 and in the second cell 102. In this scenario, separation of UEs is achieved mainly in the frequency band.

As illustrated with respect to FIGS. 2 and 3, generally—depending on the bandwidth allocation of UL transmission and DL transmission in the first and second cells 101, 102—it is possible that the first allocation scheme 491 and the second allocation scheme 492 are employed for UL transmission and/or DL transmission. E.g., for UL transmission, users that would cause high interference to each other are associated with at least partly different frequency bands, or preferably, non-overlapping frequency bands; e.g., for DL transmission, the access nodes 111, 112 are associated with at least partly different frequency bands, or preferably, non-overlapping frequency bands. Generally, scheduling in the first and second cell 101, 102 is done autonomously of each other, e.g., only considering frequency partitioning instructions; autonomously scheduling may be particularly important for UL transmission. When autonomously scheduling, a coordination of the scheduling in time domain may not need to take place.

If frequency re-using is employed, users located close to the edge of the cell are typically experiencing the highest inter-cell interference; this may hold true for, both, a fixed interferer and a mobile interferer scenario. The SINR of such users located close to the edge of the cell depends on users present in the neighboring cell. Because of this, co-scheduling of users in neighboring cells can increase the SINR 200.

To mitigate inter-cell interference for cell-edge users, it is possible to re-use radio resources by coordination of resources in time domain. This is illustrated with respect to FIGS. 6 to 8. In FIG. 6, which is the corresponding drawing to FIG. 4 with respect to the uplink scenario, a third allocation scheme 493 is illustrated. Also the third allocation scheme 493 re-uses radio resources between the first cell 101 and the second cell 102. The level of interference threshold 460 is a decision criterion for selecting between the first allocation scheme 491, the second allocation scheme 492, and the third allocation scheme 493 prior to transmitting data. In particular, for values of the SINR 200 below the level of interference threshold 460 of −10 dB, the second allocation scheme 492 is employed that does not employ frequency re-using, i.e., employs at least partly different frequency bands. To further increase the overall SINR 100, for those users that experience an SINR 200 between the level of interference thresholds 460 of −10 dB and 0 dB, the third allocation scheme 493 is employed. The third allocation scheme 493 co-schedules radio resources on the radio interface for the data transmission in the first cell 101 and the second cell 102 and employs frequency re-using; in particular, in the scenario of FIGS. 6-8, the co-scheduling occurs in such a manner that UEs 151, 152 in the first and second cells 101, 102 transmit during the same timeslot. If the SINR 200 is above the level of interference threshold 460 of 0 dB, the first allocation scheme 491 is selected. The first allocation scheme 491 employs frequency re-using and autonomously schedules radio resources on the radio interface for the data transmission in the first cell 101 and the second cell 102. Then, no coordination in time domain exists.

Thus, with respect to the scenario of FIG. 6, the following approach can be employed: First, it is assumed that frequency re-using is employed in the whole deployment area. I.e., it can be assumed that the first allocation scheme 491 is employed throughout the entire first cell 101. Next, the above mentioned metrics are estimated to determine the SINR 200 for the first allocation scheme 491. Then, the SINR 200 is compared with the level of interference threshold 460 required by the specific service. It is then possible to maintain re-using of the frequency bands in such areas of the first cell 101 where the QoS requirements of the specific service are fulfilled by the first scheduling scheme 491. Further, a coordination area corresponding to the third allocation scheme 493 can be identified for such users that need to be co-scheduled in shared resources, but still employ frequency re-using; here, the third scheduling scheme 493 is selected. Lastly, it is possible to determine those parts of the first cell that need to use separate frequency balance, i.e., no frequency re-using, to ensure a sufficiently high SINR 200 above the level of interference threshold 460; here, the second scheduling scheme 492 is selected.

An effect of this scenario is illustrated in FIG. 7. From FIG. 7 it can be seen that by employing the first allocation scheme 491, the second allocation scheme 492, and the third allocation scheme 493, a CDF 402 of the SINR 200 can be obtained which fulfills the strict QoS requirements; the SINR 200 is above the level of interference threshold of 0 dB throughout the entire first cell 101.

A further advantage of such a combined re-using both in frequency domain and time domain is illustrated in FIG. 8. FIG. 8 is the CDF 402 within the second cell 102 of the SINR 200 of UEs 151 located in different regions of the first cell 101 and caused by UEs 152 located in the second cell 102; FIG. 8 illustrates the scenarios selectively for UEs 151 in the first cell 101 below the 2nd and 20$^{th}$ cell-edge percentile, respectively. Again, it is assumed that for determining the cell-edge percentile the SINR 200 is employed as transmission quality metric. FIG. 8 relates to a mobile-interferer scenario; this is why the UE 152 being the mobile interferer can be located at any location in the second cell 102.

If users located in the first cell 101 having the 20% lowest SINRs 200 (dashed area in FIG. 6) do not employ frequency re-using and are scheduled in different frequency bands, co-scheduling the remaining 80% of the users of the first cell 101 with users in the second cell 102 employing the same resource blocks in time is possible. When the same resource blocks in time are being used by a first users in the first cell 101 and a second user in the second cell 102, it should be ensured that the interference cause by the first user at the location of the second user is low, and vice versa. Thus, it is preferable to co-schedule such first and second users in the first and second cells 101, 102 that are not subject to significant inter-cell interference; if the 20th cell-edge percentile users employ different frequency band as explained above (and, therefore, do not need to be co-scheduled), co-scheduling due to low inter-cell interference is possible for 60% of the area (coordination area), respectively users in the second cell 102 (full line in FIG. 8). Thus, a comparably large amount of 60% of the users in the second cell 102 is available for co-scheduling; this allows flexibly employing co-scheduling if compared to a scenario where only a smaller fraction of the users in the second cell 102 could participate in co-scheduling.

In this respect, if only the users of the first cell 101 having the 2% lowest SINRs 200 use different frequency bands, co-scheduling the remaining 98% of the users of the first cell 101 with users in the second cell 102 employing the same resources blocks in time is possible with respect to only 10% of the users in the second cell (dotted line in FIG. 8). Thus, the probability to find a user in the second cell 100 that can be co-scheduled according to the third allocation scheme 493 is comparatively low and the corresponding coordination area is intermitted, spread out, and has many small and narrow spots. Thus, in such a scenario, it can be difficult to implement the co-scheduling.

Hence, generally it is possible to select, from a plurality of UEs 152 in the second cell 102, a given UE 152 to co-schedule with a UE 151 in the first cell 101. Said selecting of the given UE 152 may be based on the SINR 200 at the location of the given UE 152; this SINR 200 may be compared with the level of interference threshold 460, e.g., in a threshold comparison. Optionally, a different level of interference threshold may be considered.

As can be seen from the above, by such an approach it is possible to calculate the probability of finding user in neighboring cells that can be co-scheduled with a user to guarantee QoS requirements. The probability is calculated based on how large the coordination area is in the neighboring cells. The fraction of the coordination area, if compared to the total service area, is identified by the coverage requirement in the first cell.

Above, a scenario has been illustrated that relies on, both, frequency separation and co-scheduling of neighboring cells 101, 102. However, it should be understood that it is also possible to employ co-scheduling in a scenario where frequency re-using is employed only, i.e., no separation of frequency between neighboring cells 101, 102 occurs. Then, it can be required to take into account coverage requirements that are comparably strict. E.g., if radio access technology according to the 3GPP 3G or 4G standard is employed, the coverage requirement can be in the order of the 5th percentile. In future cellular networks, the coverage requirement can be as high as the 0.001th percentile.

Figure 9:
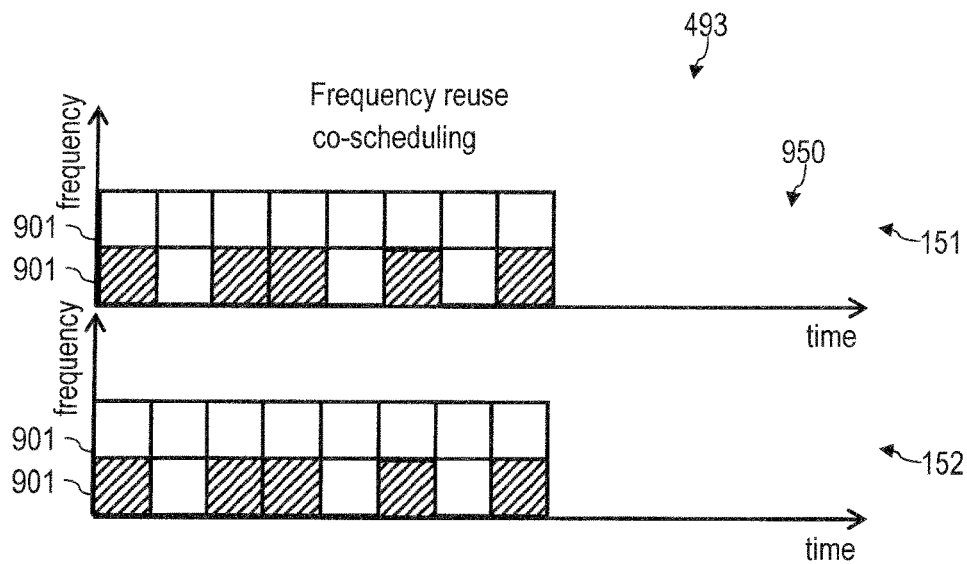
FIG. 9 illustrates resources on the radio interface of the cellular network in case frequency re-using and co-scheduling between the first cell and the second cell is employed.

As mentioned above with respect to FIGS. 6-8, the third allocation scheme 493 employs frequency re-using and further co-schedules UEs 151, 152 in the first cell 101 and the second cell 102 during the same timeslot. Such a scenario is illustrated in FIG. 9. In FIG. 9, upper part, resource blocks 901 as used by the UE 151 in the first cell 101 are shown for different frequencies and times. In FIG. 9, lower part, resource blocks 901 used by the UE 152 in the second cell 102 are shown for the different frequencies and times. Sometimes the resource blocks 901 may be referred to as timeslots. Resource blocks 901 that are allocated by the third allocation scheme 493 are illustrated with the dashed filling in FIG. 9. As can be seen from FIG. 9, the UE 151 in the first cell 101 transmits in the same resource blocks 901 as the second UE 152 in the second cell 102, i.e., the frequency is re-used and co-scheduling is employed.

Figure 10:
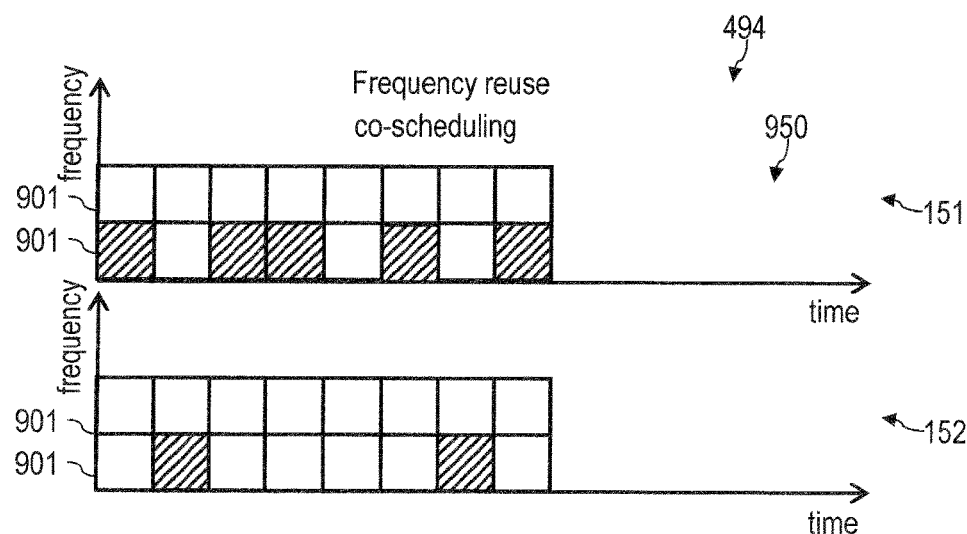
FIG. 10 illustrates resources on the radio interface of the cellular network in case frequency re-using and co-scheduling between the first cell and the second cell is employed.

In FIG. 10, a further scenario of co-scheduling UEs in the first cell 101 and the second cell 102 is illustrated corresponding to a fourth scheduling scheme 494. Namely, in the scenario FIG. 10 the UE 151 located in the first cell 101 employs different resource blocks 901 for data transmission on the radio interface than the UE 152 located in the second cell 102, but re-uses the respective frequency band. In such a technique, it is possible to further reduce inter-cell interference. Also in the scenario of FIG. 10, frequency re-using is employed.

Figure 11:
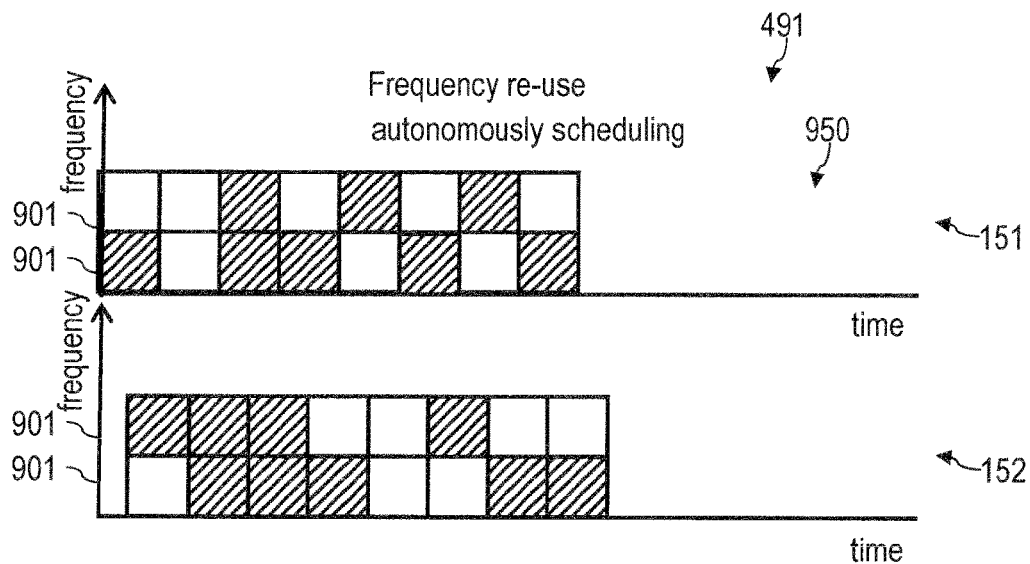
FIG. 11 illustrates resources on a radio interface of the cellular network in case frequency re-using and autonomously scheduling between the first cell and the second cell is employed.

In FIG. 11, a scenario illustrated, where UEs in the first cell 101 and in the second cell 102 are autonomously scheduled. As can be seen, there is no co-scheduling pattern existent and the resource blocks 901 are not synchronized in time. Further, in the scenario of FIG. 11, the UEs in the first cell 101 and in the second cell 102 use the same frequency bands, i.e., frequency re-using is employed. E.g., the scenario of FIG. 11 can be employed as the first allocation scheme 491 as explained above.

Figure 12:
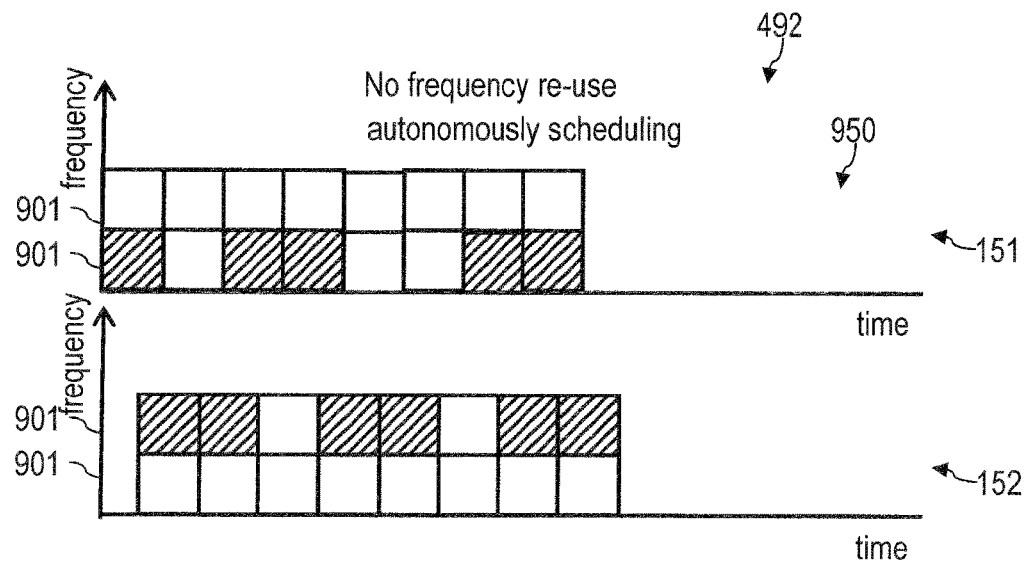
FIG. 12 illustrates resources on a radio interface of the cellular network in case no frequency re-using and autonomously scheduling between the first cell and the second cell is employed.

In FIG. 12, a scenario is illustrated where frequency re-using is not employed. As can be seen, the UE 151 located in the first cell 101 transmits data in a different frequency band than the UE 152 located in the second cell 1 102. Because the UEs 151, 150 transmit data in different frequency bands, there is no need of co-scheduling. Consequently, the UE 151 and the UE 152 are autonomously scheduled. E.g., the scenario of FIG. 12 can be employed as the second allocation scheme 492 as explained above.

Not employing frequency re-using as illustrated e.g. with respect to FIG. 12 can correspond to a frequency re-use factor of larger than 1. Typically, a frequency re-use factor of larger than 1 corresponds to neighboring cells not transmitting in the same frequency bands. A coordination of frequency re-using may or may not be present between remote cells other than the direct neighbors.

Figure 13:
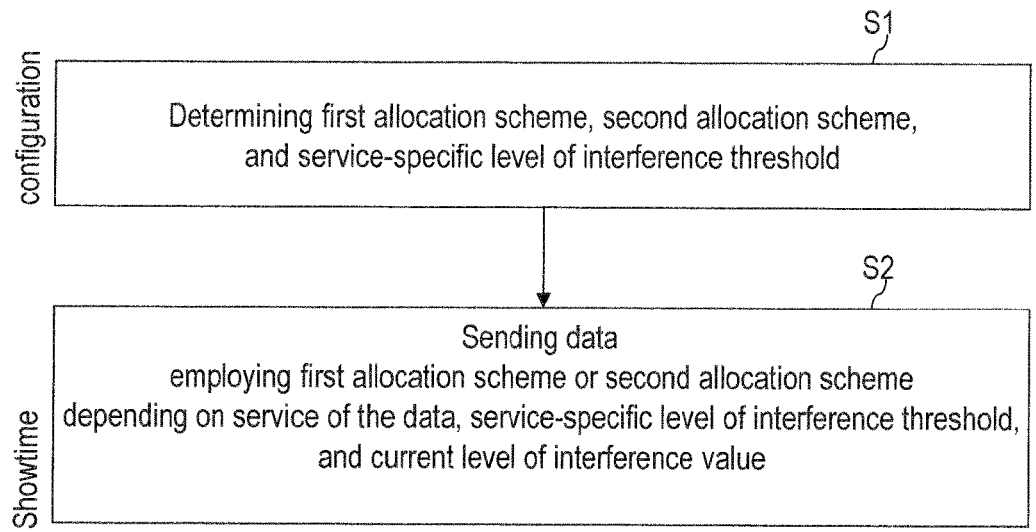
FIG. 13 is a flowchart of a method according to various embodiments.

Above, various techniques relating to the determining of different allocation schemes 491, 492, 493, 494, as well as of the level of interference threshold 460 have been discussed. As mentioned above, it is possible that such techniques are executed in a configuration or planning mode, i.e., prior to the need of sending data via the radio interface. With reference to FIG. 13, such techniques may be applied during S1. In particular, in S1 it is possible to determine a plurality of service-specific level of interference thresholds 491, 492, 493, 494.

Then, during Showtime (step S2 of FIG. 13), in a situation where data is actually being transmitted over the radio interface, it is possible to select between the previously determined allocation scheme 491, 492, 493, 494 depending on the service of the data. Thus, it is possible that for different services different allocation schemes 491, 492, 493, 494 are employed at S2 and/or different level of interference thresholds 460 are considered. E.g., it is possible that the allocation schemes 491, 492, 493, 494 and/or the level of interference thresholds 460 for different services and different directions (e.g. UL transmission and/or DL transmission) are stored in a memory of the UEs 151, 152 and/or of the access nodes 111, 112 at S1. Then, at S2, the level of interference threshold 460 and/or the allocation schemes 491, 492, 493, 494 may be retrieved from the memory.

Figure 14:
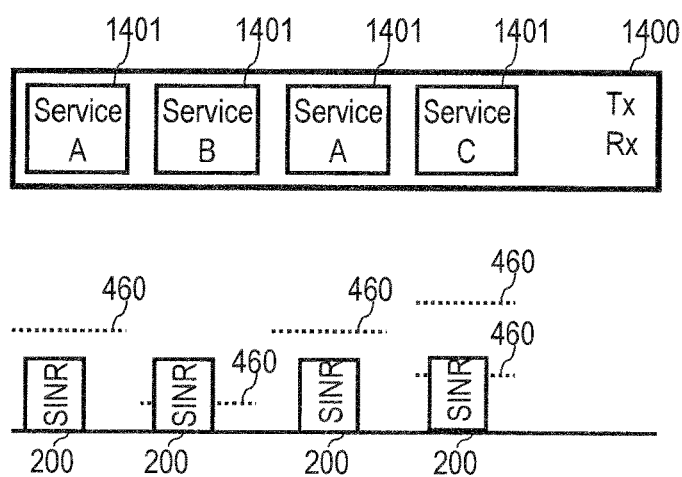
FIG. 14 illustrates a service-specific level of interference threshold for data of different services, the services being associated with different quality of service requirements.

Now referring to FIG. 14, a transmit buffer 1400 is illustrated; the transmit buffer may be a send buffer or a receive buffer. There are in total four data packets 1401 in the buffer 1400. The different data packets 1401 carry data of different services. As can be seen from FIG. 14, the different services are associated with different level of interference thresholds 460. For example, the level of interference threshold 460 of the data packet 1401 belonging to service A is higher than the level of interference threshold 460 of data packets 1401 belonging to service B. For service C, two level of interference thresholds 460 exists; here, it can be possible to select between three different allocation schemes 491, 492, 493, 494.

Generally, the service associated with data packets 1401 may not be particularly limited. E.g., the service can be selected from the group comprising: UL data, DL data, an application providing the data, and a recipient of the data; an encoding scheme; a modulation scheme. The application providing the data can vary, e.g., including a sensor application, a camera providing uni-directional data for UL transmission, an actuator application or motion control.

In response to a need of transmitting the data packets 1401, it is possible to establish the service-specific level of interference thresholds 460. Further, the SINR 200 present on the radio interface can be established. Establishing the SINR 200 can be based on measurements and/or estimations of the SINR 200, e.g., based on models, and/or receiving a control message indicating the SINR 200. E.g., the control message can be a CQI. Then, it is possible to execute a threshold comparison between the SINR 200 and the established threshold 460. Said selecting between the various allocation schemes 491, 492, 493, 494 can be based on the threshold comparison.

As mentioned above, it is possible that an allocation scheme 493, 494 is employed that employs co-scheduling in time domain. In such a case, it may be required to establish control signaling between the two access nodes 111, 112. Control signaling may allow establishing synchronization in time. Control signaling may further be required to select a specific UE 151 located in the first cell 101 and a further UE 152 located in the second cell 102 that are co-scheduled. The specific UE 151 and the further UE 152 should be selected so that the inter-cell interference between these UEs 151, 152 is low. Making reference to FIG. 3, such a selection of the further UE 152 located in the second cell 102 may be based on a SINR 200 present at the location of the further UE 152. In particular, the further UE 152 may be selected such that the inter-cell interference caused by the further UE 152 at the location of the given UE 151 located in the first cell 101 is below a certain threshold. Such a selecting of the UEs 151, 152 that are co-scheduled can be executed by a scheduler of the cellular network 100, e.g., by at least one of the access nodes 111, 112.

In particular in such a case the logic for said selecting between the various allocation schemes 491, 492, 493, 494 may primarily reside at the network side of the cellular network 100. However, generally, it is also possible that the logic for said selecting between the various allocation schemes 491, 492, 493, 494 primarily resides within each one of the UEs 151, 152; this may be particularly relevant in device-to-device (D2D, also often referred as machine-to-machine (M2M) or machine-type communication (MTC)) scenarios where the UEs 151, 152 operate comparably autonomously. In other words, it is possible that S2, as referred to in FIG. 13, is executed by at least one of the access nodes 111, 112 and/or by at least one of the UEs 151, 152.

If, for example, the logic for said selecting resides primarily within the network side of the cellular network 100, it is possible that a control message is sent from the cellular network 100 to the UEs 151, 152 that explicitly or implicitly indicates the selected allocation scheme 491, 492, 493, 494. Then, the respective UE 151, 152 can receive the control message. It is possible that the control message is sent via a control channel of the radio interface.

Figure 15:
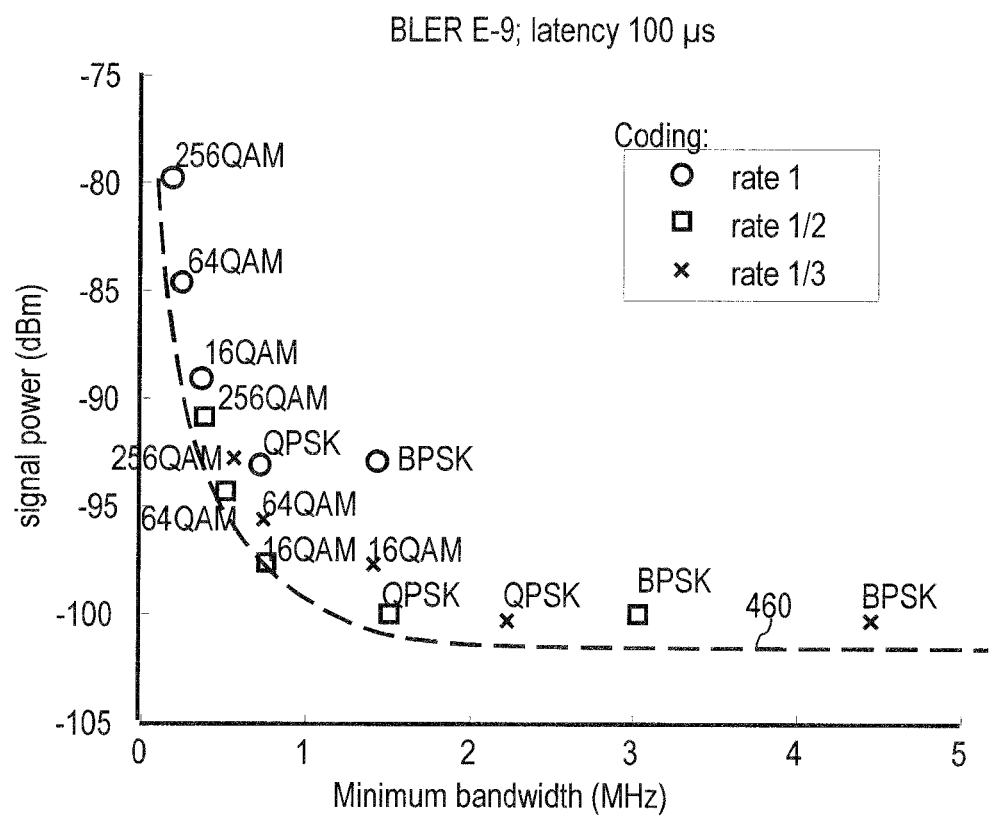
FIG. 15 illustrates a dependency of the service-specific level of interference thresholds on different quality of service requirements.

FIG. 15 illustrates an example of how the QoS requirement of a specific service can be translated into the level of interference threshold 460. As mentioned above, it is assumed that according to various embodiments a particular QoS requirement is translated into a minimum required SINR 200. This minimum required SINR corresponds to the level of interference threshold 460. Here, it is assumed that in order to guarantee the required BLER and a required latency of the data transmission using a certain antenna configuration, a certain Modulation Coding Scheme (MCS) configuration and a given bandwidth, the level of interference threshold 460 can be determined. In particular, it is possible that depending on UL transmission and DL transmission, different level of interference thresholds 460 are determined.

In particular, FIG. 15 shows, for different modulation techniques such as Binary Phase Shift Keying (BPSK), Quadrature Phase Shift Keying (QPSK), 16-bit Quadrature Amplitude Modulation (QAM), 64-bit QAM, and 256-bit QAM, as well as different coding rate values of the required minimum received signal power as a function of the minimum required bandwidth for the cellular network 100 of FIG. 1. From this, the level of interference threshold 460 can be estimated (dashed curve). A typical QoS requirement can correspond to a BLER of 10E-9 and a latency of 0.1 ms for a 100 bit packet of data 1401. Further parameters that typically influence said determining of the SINR 200 are the antenna configuration and the MCS. FIG. 15 is an example only. Depending on the specific services employed and the particular preferences of the user, it is possible to employ widely varying QoS requirements.

It is noted that the data of FIG. 15 is obtained from a model-based calculation of the SINR 200. In particular, it is assumed that two access nodes 111, 112 are located at center of halls having sizes of 200×200 m and 100×100 m, respectively. Multi-Input Multi-Output (MIMO) having a 1×8 antenna array is considered. However, such parameters are only for illustrative purposes.

Figure 16:
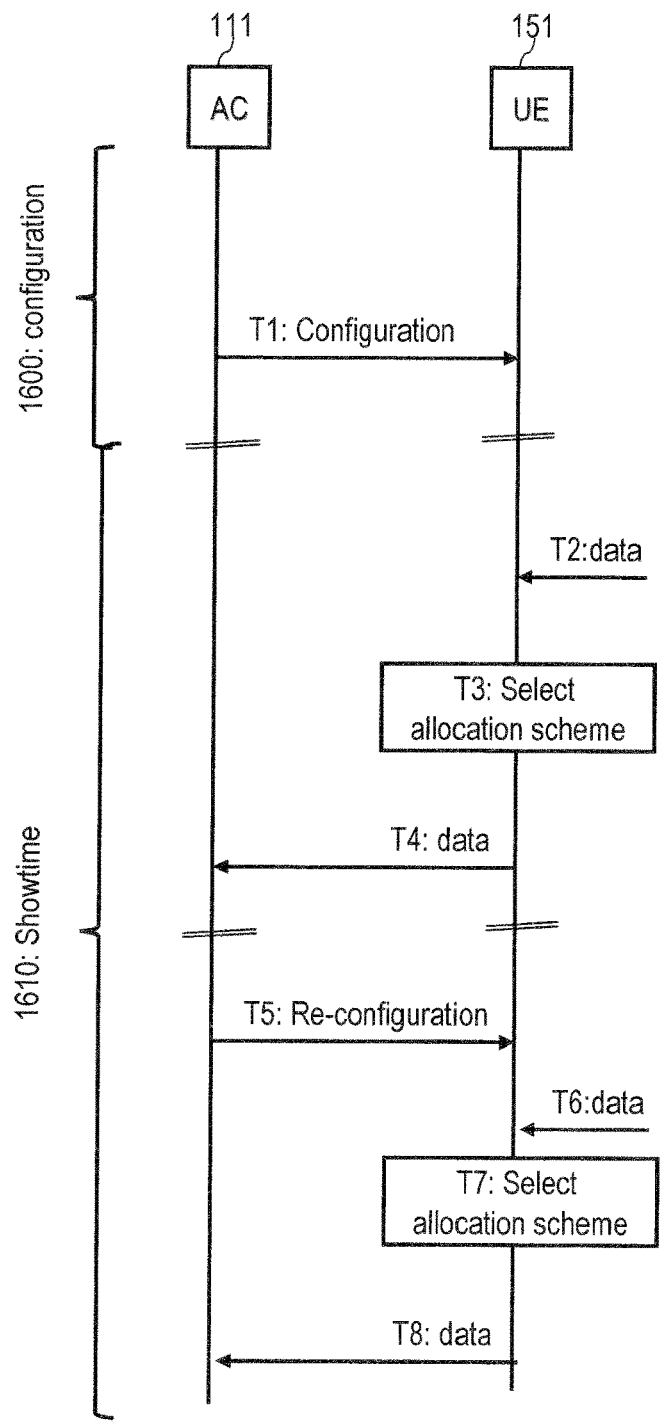
FIG. 16 is a signaling diagram illustrating various embodiments.

FIG. 16 is a signaling diagram example illustrating techniques according to various embodiments. T1 is a control message sent from the access node 111 to the UE 151. In particular, the control message T1 is sent during a configuration mode 1600. The configuration mode 1600 is executed prior to any of transmitting data 1401 on the radio interface 950. During Showtime 1610, data 1401 is scheduled for transmission by the UE 151, T2. E.g., the data 1401 may arrive in the send buffer 1400. At T3, the UE 151 selects the allocation scheme. For this, the UE 151 takes into account the specific service of the data 1401 to be transmitted. Depending on the service of the data 1401 to be transmitted, the UE 151 establishes the service-specific level of interference threshold 460 and, based on this level of interference threshold 460 selects the corresponding allocation scheme 491, 492, 493, 494. Then the data 1401 is sent via the radio interface 950, T4.

Here, the control message T1 has been transmitted prior to Showtime 1610, i.e., during the configuration mode 1600. Alternatively or additionally, it is also possible to configure during Showtime 1610. This occurs by means of the control message T5. When further data 1401 arrives in a send buffer of the UE 151 at T6, the UE 151 selects the allocation schemes anew, T7, and accordingly sends the data 1401 at T8.

As can be seen, in the scenario of FIG. 16 the decision logic for selecting between the various allocation schemes 491, 492, 493, 494 resides within the UE 151. In particular, it is not necessary to involve a scheduler of the cellular network 100 in said selecting. This facilitates applicability in MTC networks where a large number of devices are connected.

Figure 17:
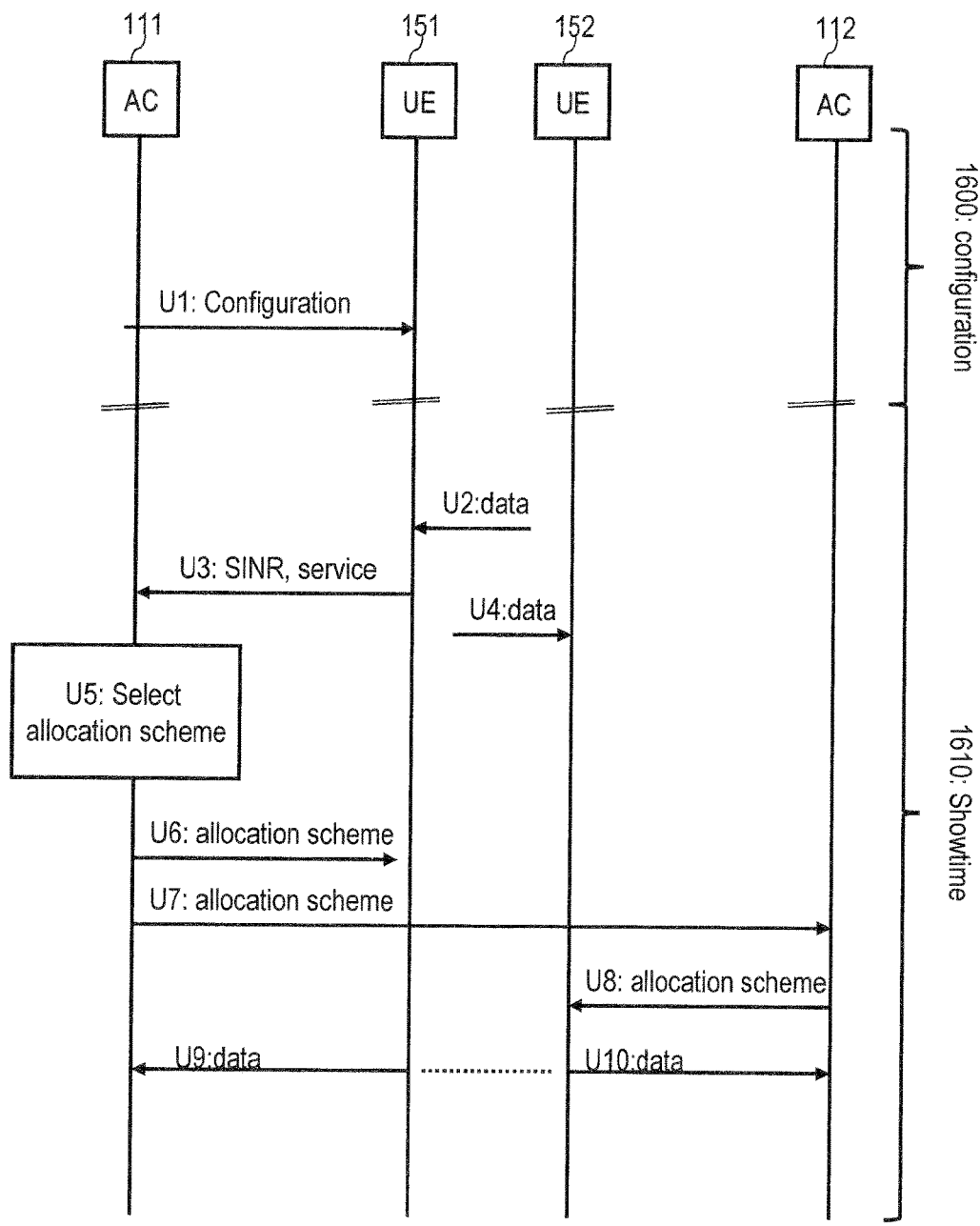
FIG. 17 is a signaling diagram illustrating various embodiments.

Differently, in the example scenario of FIG. 17 the decision logic for selecting between the various allocation schemes 491, 492, 493, 494 resides in the e network side of the cellular network 100, i.e., in access node 111. This is explained hereinafter in greater detail.

U1, U2 correspond to T1, T2. U3 is a control message sent from the UE 151 to the access node 111. The control message U3 specifies the SINR 200 at the location of the UE 151. Alternatively the access node 111 may operate with an estimated SINR 200. Further, the control message U3 specifies the service of the data 1401 scheduled for transmission at the UE 151. Based on this information, the access node 111 selects the allocation scheme 491, 492, 493, U5. In particular, the access node 111 can establish the service-specific level of interference threshold 460 and, based on the level of interference threshold 460 and further based on the reported or estimated SINR 200 at the location of the UE 151, execute said selecting.

A control message U6 reports parameters of the selected allocation scheme 491, 492, 493, 494 to the UE 151. A further control message U7 is sent to the access node 112 of the second cell 102. Also the further control message U7 indicates parameters of the selected allocation scheme 491, 492, 493, 494. The further control message U7 is sent to the access node 112, because at U5 an allocation scheme 491, 492, 493, 494 has been selected that employs co-scheduling between the first and second cells 101, 102. The access node 112 sends the control message U8 to the UE 152 located in the second cell 102. The control message U8 also indicates the selected allocation scheme 491, 492, 493, 494. By means of the control messages U6, U8, the UEs 151, 152 can be co-scheduled. Because of this, at U9, U10, the UEs 151, 152 transmit the data 1401 in corresponding timeslots (cf. FIGS. 9 and 10).

Figure 18:
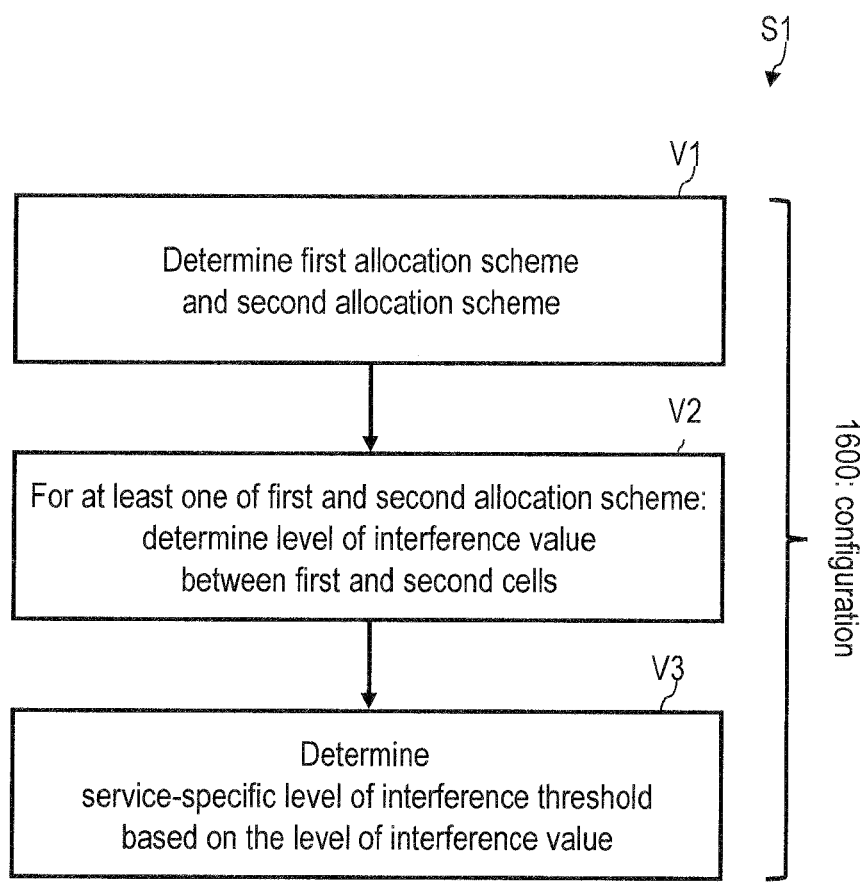
FIG. 18 is a flowchart of a method according to various embodiments.

FIG. 18 is an example flowchart of a method according to various embodiments. In particular, FIG. 18 illustrates a method that that are executed as part of the configuration mode 1600, i.e., as part of step S1 (see FIG. 13).

First, at V1, the first allocation scheme 491 and the second allocation scheme 492 are determined. Generally, it should be understood that the first allocation scheme 491 and/or the second allocation scheme 492 can be determined in a service-specific manner. Thus, it is generally possible that for different services of the data 1401 to be transmitted via the radio interface 950, different allocation schemes 491, 492, 493, 494 are determined. However, it is also possible that the allocation schemes 491, 492, 493, 494 are determined independent of the service, i.e., for all services alike.

Next, at V2, the SINR 200 is determined for at least one of the first and second allocation schemes 491, 492. E.g., the SINR 200 may be determined for the particular one of the allocation schemes 491, 492 that employs frequency re-using without co-scheduling.

Then, at V3, the service-specific level of interference threshold 460 can be determined based on the determined SINR 200. The level of interference threshold 460 is determined such that the expected SINR 200 is above the threshold 460 for all locations in the first cell 101.

Figure 19:
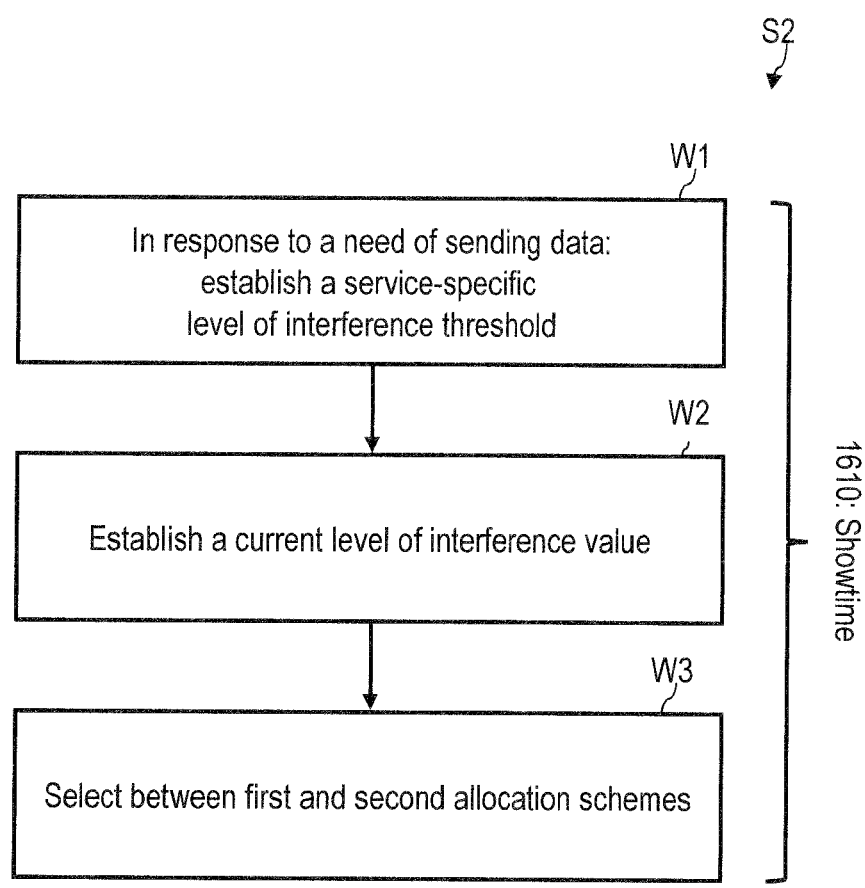
FIG. 19 is a flowchart of a method according to various embodiments.

The level of interference threshold 460 can then serve as a decision criterion for selecting between the determined first and second allocation schemes 491, 492 during Showtime 1610. This is illustrated in the example flowchart of FIG. 19. Namely, at W1, a need of sending the data 1401 exists. This causes selecting the predetermined service-specific level of interference threshold 460 (as obtained, e.g., from V3 as explained above).

At W2, the SINR 200 present on the radio interface 950 at the location of the UE 151 is established. Execution of W2 can comprise at least one of the following: measuring the SINR 200, receiving a control message indicating the SINR 200, estimating the SINR 200, e.g., based on models.

At W3, it is selected between the predetermined first and second allocation schemes 491, 492, e.g., as obtained from V1. Execution of W3 can include executing a threshold comparison between the established SINR 200 and the established level of interference threshold 460.

Generally, it is possible that steps W1-W3 are executed by the access node 111 and/or the UE 151.

Figure 20:
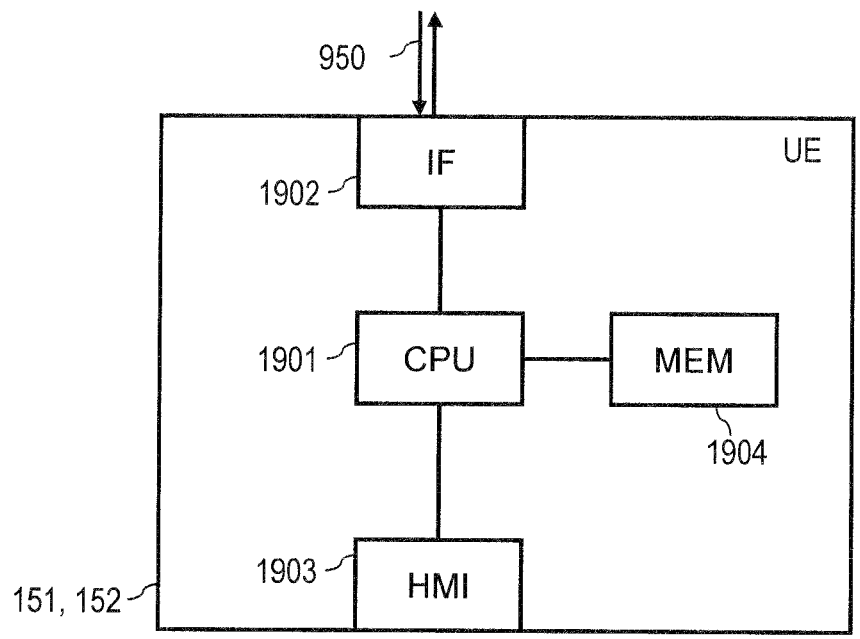
FIG. 20 schematically illustrates a communication device according to various embodiments.

FIG. 20 schematically illustrates the UEs 151, 152. The UEs 151, 152 comprise a processor 1901. E.g., the processor 1901 can be a multi-core processor; it is also possible to employ shared or distributed computing. Further, the UEs 151, 152 comprise an interface 1902. The interface 1902 is configured to transmit data 1401 via the radio interface 950 of the cellular network 100. Transmitting data corresponds to sending data and/or receiving data. In other words, the interface 1902 is configured for UL transmission and/or DL transmission. Further, the UEs 151, 152 comprise a human machine interface (HMI) 1903. Via the HMI 1903 it is possible to receive instructions from a user and/or output instruction to the user.

Further, the UEs 151, 152 comprise a memory 1904, e.g., a non-volatile memory 1904. The memory comprises control instructions that can be executed by the processor 1901. Executing the control instructions causes the processor 1901 to perform methods as explained above with respect to the various embodiments. In particular, executing the control instructions causes the processor 1901 to select between the various scheduling schemes 491, 492, 493, establish the service-specific level of interference threshold 460, and/or establish the SINR 200 present on the radio interface 950 of the cellular network 100 at the location of the UE 151, 152.

Figure 21:
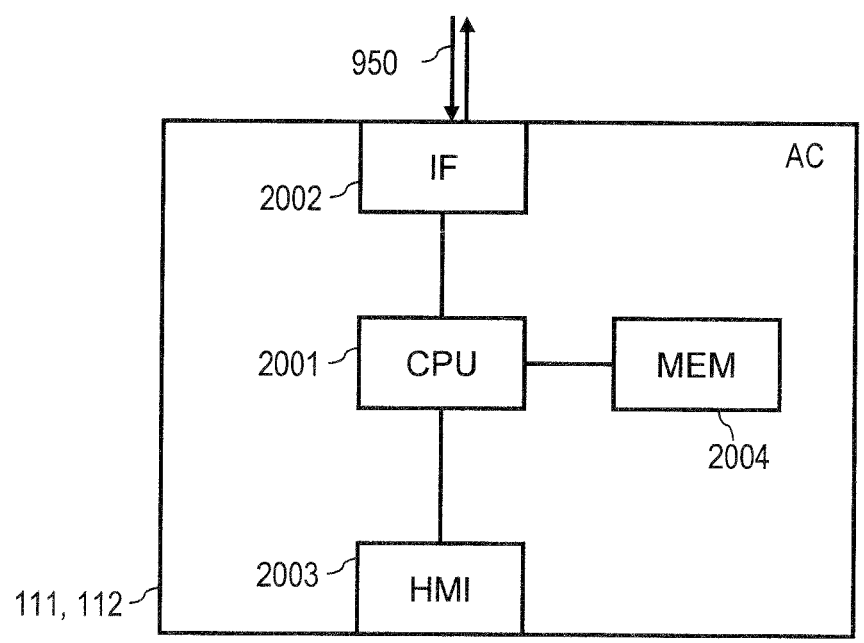
FIG. 21 schematically illustrates an access node of the cellular network according to various embodiments.

Turning to FIG. 21, the access nodes 111, 112 are schematically illustrated. The access nodes 111, 112 comprise a processor 2001. E.g., the processor 2001 can be a multi-core processor; it is also possible to employ shared or distributed computing. Further, the access nodes 111, 112 comprise an interface 2002. The interface 2002 is configured to transmit data 1401 via the radio interface 950 of the cellular network 100. Transmitting the data 1401 corresponds to UL transmission and/or DL transmission, as explained above. Further, the access nodes 111, 112 comprise an HMI 2003. Via the HMI 2003 it is possible to receive instructions from the user and/or output instructions to the user.

Further, the access nodes 111, 112 comprise a memory 2004, e.g., a non-volatile memory 2004. The memory 2004 comprises control instructions that can be executed by the processor 2001. Executing the control instructions causes the processor 2001 to perform methods as explained above with respect to the various embodiments. In particular, executing the control instructions can cause the processor 2001 to select between the various scheduling schemes 491, 492, 493, 494 establish the service-specific level of interference threshold 460, and/or establish the SINR 200 present on the radio interface 950 of the cellular network 100 at the location of the UEs 151, 152.

Summarizing, above techniques have been discussed that employ re-using of resources between neighboring cells. Said re-using of the resources can occur in time domain and/or frequency domain. Depending on the service requirements, it is possible to use these two approaches separately or in a combined manner. E.g., in a scenario where the service requirement on latency is comparably relaxed, it is possible to use a scheduling scheme that employs frequency re-using and co-schedules users in neighboring cells. One the other hand, for strict requirements regarding both latency and reliability—corresponding to a low BLER—it can be preferable to employ a scheduling scheme that does not rely on frequency re-using. Then, a coordination area for co-scheduling in time domain is comparably large, as explained with respect to FIG. 8 above. Hence, in such a scenario it is possible to use separate frequency (no frequency re-using) for users that have a small coordination area; while co-scheduling is employed for such users that have comparatively large coordination area.

Summarizing, above under a first aspect a method of transmitting data on a radio interface of the cellular network has been presented. The method comprises establishing a service-specific level of interference threshold of the service and further establishing a level of interference value present on the radio interface, based on a service associated with the data. The method further comprises, based on the established level of interference threshold and further based on the established level of interference value, selecting between a predetermined first allocation scheme of radio resources on the radio interface and a predetermined second allocation scheme of radio resources on the radio interface. The method further comprises transmitting the data on the radio interface employing radio resources indicated by the selected one of the first allocation scheme and the second allocation scheme.

Further refinements of the method under the first aspect may comprise:

The level of interference threshold may comprise a signal-to-noise threshold. The establishing of the level of interference value may comprise measuring a signal-to-noise value on the radio interface. Said selecting between the first allocation scheme and the second allocation scheme may comprise executing a threshold comparison between the signal-to-noise threshold and the measured signal-to-noise value. Then, said selecting may be based on the threshold comparison.

Said establishing of the service specific level of interference threshold and said establishing of the level of interference value may be in response to a need of transmitting data on the radio interface.

E.g., the method may comprise, in a configuration mode that is executed prior to the need of transmitting the data on the radio interface: receiving at least one configuration message. The at least one configuration message may indicate the first allocation scheme, the second allocation scheme, and the service-specific level of interference threshold. The method may further comprise, in the configuration mode: storing, in a memory, the first allocation scheme, the second allocation scheme, and the service-specific level of interference threshold. Said establishing of the service-specific level of interference threshold may comprise retrieving the service-specific level of interference threshold from the memory. Said selecting between the first allocation scheme and the second allocation scheme may comprise at least partly retrieving the selected one of the first allocation scheme and the second allocation scheme from the memory.

For example, the at least one configuration message may indicate, for each one of the plurality of services: the respective first allocation scheme, the respective second allocation scheme, and the service-specific level of interference threshold of the respective service.

For example, the first allocation scheme may co-schedule radio resources on the radio interface for data transmission in the first cell of the cellular network and the second cell of the cellular network. Alternatively or additionally, the second allocation scheme may autonomously schedule radio resources on the radio interface for the data transmission in the first cell and in the second cell.

The established level of interference value may be present on the radio interface at a communication device that is attached to the cellular network and located in the first cell. The first allocation scheme may co-schedule the data transmission of the communication device located in the first cell and the data transmission of the given communication devices located in the second cell. Then, said method may further comprise, for a plurality of further communication devices located in the second cell: establishing a further level of interference value present on the radio interface at the respective one of the plurality of further communication devices, and, based on the established for the level of interference values of the plurality of further communication devices, selecting the given communication device.

For example, the first allocation scheme may allocate a common frequency band to radio resources on the radio interface for the data transmission in the first cell of the cellular network and a second cell of the cellular network. The second allocation scheme may allocate at least partly different frequency bands to radio resources on the radio interface for the data transmission in the first cell and the second cell.

For example, said selecting may comprise selecting between the first allocation scheme, the second allocation scheme, and a predetermined third allocation scheme of radio resources on the radio interface. For example, the first allocation scheme may allocate a common frequency band to radio resources on the radio interface for the data transmission in a first cell of the cellular network and in the second cell of the cellular network. The second allocation scheme may allocate at least partly different frequency bands to radio resources on the radio interface for the data transmission in the first cell and the second cell. The third allocation scheme may allocate a common frequency bands to radio resources on the radio interface for the data transmission in the first cell of the cellular network and in the second cell of the cellular network. The first allocation scheme may autonomously schedule radio resources on the radio interface for the data transmission in the first cell and in the second cell. The second allocation scheme may autonomously schedule radio resources on the radio interface for the data transmission in the first cell and in the second cell. The third allocation scheme may co-schedule radio resources on the radio interface for data transmission in the first cell and in the second cell.

The method may further comprises sending, to a communication device that is attached to the cellular network via the radio interface, a control message. The control message at least partly indicates the selected one of the first allocation scheme and the second allocation scheme.

Said selecting between the first allocation scheme and the second allocation scheme may comprise a communication device that is attached to the cellular network via the radio interface receiving a control message from the cellular network. The control message may at least partly indicate the first allocation scheme and/or the second allocation scheme.

The service may be selected from the group comprising: uplink data; downlink data; an application providing the data; a recipient of the data; an encoding scheme; a modulation scheme.

Said establishing of the level of interference value present on the radio interface may comprise at least one of the following: measuring the level of interference at the location of the communication device: estimating the level of interference at the location of the communication device; receiving a control message indicating the level of interference at the location of the communication device.

According to a second aspect, a device has been explained. The device comprises an interface configured to transmit data via a radio interface of a cellular network. The device further comprises at least one processor. The at least one processor is configured to establish, based on a service associated with the data, a service-specific level of interference threshold of the service and further configured to establish a level of interference value present on the radio interface. The at least one processor is further configured to select between a predetermined first allocation and a predetermined second allocation scheme of radio resources on the radio interface. Said selecting is based on the established level of interference threshold and further based on the established level of interference value. The at least one processor is configured to transmit the data on the radio interface employing radio resources indicating by the selected one of the first allocation scheme and the second allocation scheme.

Further refinements of the device under the second aspect may comprise:

For example, the device may be a communication device that is attached to the cellular network via the radio interface.

It is also possible that the device is a scheduler of the cellular network. E.g., the scheduling functionality may be implemented in an access node of the cellular network.

Further the device according to the second aspect may be configured to execute the method according to the first aspect with all its refinements.

Under a third aspect a method of resource allocation has been illustrated above. The method comprises, for each one of the plurality of services for which data transmission on a radio interface of a cellular network is available: determining a first allocation scheme of radio resources on the radio interface and a second allocation scheme of radio resources on the radio interface. The first allocation re-uses radio resources on the radio interface between a first cell and a second cell of the cellular network. The method further comprises, for each one of the plurality of services and for at least one of the first allocation scheme and the second allocation scheme: determining a level of interference value between the first cell and the second cell. The method further comprises, for at least one of the plurality of services: based on the determined level of interference value and further based on a service-specific quality of service requirement of the respective service, determining a service-specific level of interference threshold of the respective service. The service-specific level of interference threshold is suited to be used as decision criterion for selecting between the first allocation scheme and the second allocation scheme prior to transmitting the data of the respective service on the radio interface.

For example, determining of the first allocation scheme and of the second allocation scheme and of the level of interference and of the service-specific level of interference thresholds may be part of a configuration mode being executed prior to a need of transmitting data on the radio interface. The configuration mode comprises sending, to a communication device is located in the first cell, at least one configuration message. The at least one configuration message may indicate the first allocation scheme, the second allocation scheme, and the service-specific level of interference threshold associated with at least one of the plurality of services.

Further refinements of the method under the third aspect may comprise:

The first allocation scheme of the given one of the plurality of services may allocate a common frequency band to radio resources on the radio interface for the data transmission in the first cell and the second cell. The second allocation scheme of the given one of the plurality of services may allocate at least partly different frequency bands to radio resources on the radio interface for the data transmission in the first cell and the second cell.

The first allocation scheme of the given one of the plurality of services may co-schedule radio resources on the radio interface for the data transmission in the first cell and the second cell. The second allocation scheme of the given one of the plurality of services may autonomously schedule radio resources on the radio interface for the data transmission in the first cell and the second cell.

The method may further comprise, for each one of the plurality of services, determining a third allocation scheme of radio resources on the radio interface. The third allocation scheme of radio resources may re-use the radio resources between the first cell and the second cell. It is possible that the service-specific level of interference threshold is suited to be used as a decision criterion for selecting between the first allocation scheme, the second allocation scheme, and the third allocation scheme prior to enabling transmission of data of the respective service on the radio interface. The first allocation scheme may allocate a common frequency band to radio resources on the radio interface for the data transmission in the first cell and in the second cell. The second allocation scheme may allocate at least partly different frequency bands to radio resources on the radio interface for the data transmission in the first cell and the second cell. The third allocation scheme may allocate a common frequency band to radio resources on the radio interface for the data transmission in the first cell and the second cell. The first allocation scheme may autonomously schedule radio resources on the radio interface for the data transmission in the first cell and the second cell. The second allocation scheme may autonomously schedule radio resources on the radio interface for the data transmission in the first cell and the second cell. The third allocation scheme may co-schedule radio resources on the radio interface for the data transmission in the first cell and the second cell of the cellular network.

The level of interference value may be determined based on a model-based performance metric yielding a distribution of signal-to-noise values for different locations at least in the first cell, wherein the model-based performance metric considers a spatial geometry of the first cell and the second cell.

It is possible that the level of interference threshold comprises a signal-to-noise threshold. The model-based performance metric may consider a spatially resolved pathgain model between any pair of locations within the first cell and the second cell to determine a noise contribution to the signal-to-noise threshold.

The level of interference threshold may comprise a signal-to-noise threshold.

For example, the model-based performance metric may consider a cell-edge user throughput criterion to determine a signal contribution of the signal-to-noise threshold.

The level of interference value may be determined based on a control message that is received from the communication device located in the first cell for the second cell.

The service may be selected from the group comprising: uplink data; downlink data; an application providing the data; a recipient of the data; and encoding scheme; a modulation scheme According to a fourth aspect, a device has been explained. The device comprises at least one processor configured to execute, for each one of a plurality of services for which data transmission on a radio interface of a cellular network is available, the following steps: determining a first allocation scheme of radio resources on the radio interface and a second allocation scheme of radio resources on the radio interface, the first allocation scheme re-using radio resources on the radio interface between a first cell and a second cell of the cellular network; and for at least one of the first allocation scheme and the second allocation scheme, determining a level of interference value between the first cell and the second cell; and based on the determined level of interference value and further based on a service-specific quality of service requirement of the respective service: determining a service-specific level of interference threshold of the respective service, the service-specific level of interference threshold being suited to be used as a decision criterion for selecting between the first allocation scheme and the second allocation scheme prior to enabling transmission of data of the respective service on the radio interface.

Further the device according to the fourth aspect may be configured to execute the method according to the third aspect with all its refinements.

Under a fifth aspect a computer program product has been explained. The computer program product comprises program code to be executed by at least one processor of a device, wherein execution of the program code causes the at least one processor to execute a method according to the first or the third aspect with all their refinements.

E.g., the computer program product may comprise a tangible medium storing the program code.

According to a sixth aspect, a device is provided. The device comprises means to transmit data via a radio interface of a cellular network. The device further comprises means for establishing, based on a service associated with the data, a service-specific level of interference threshold of the service. The device further comprises means for establishing a level of interference value present on the radio interface. The device further comprises means for selecting between a predetermined first allocation scheme of radio resources on the radio interface and a predetermined second allocation scheme of radio resources on the radio interface, said selecting being based on the established level of interference threshold and further being based on the established level of interference value. The device further comprises means for transmitting the data on the radio interface employing radio resources indicated by the selected one of the first allocation scheme and the second allocation scheme.

According to a seventh aspect, a device is provided. The device comprises means for determining, for each one of a plurality of services for which data transmission on a radio interface of a cellular network is available, a first allocation scheme of radio resources on the radio interface and a second allocation scheme of radio resources on the radio interface. The first allocation scheme re-uses radio resources on the radio interface between a first cell and a second cell of the cellular network. The device further comprises means for determining, for each one of the plurality of services and for at least one of the first allocation scheme and the second allocation scheme, a level of interference value between the first cell and the second cell. The device further comprises means for determining, for each one of the plurality of services and based on the determined level of interference value and further based on a service-specific quality of service requirement of the respective service, a service-specific level of interference threshold of the respective service. The service-specific level of interference threshold being suited to be used as a decision criterion for selecting between the first allocation scheme and the second allocation scheme prior to enabling transmission of data of the respective service on the radio interface.

Although the invention has been shown and described with respect to certain preferred embodiments, equivalents and modifications will occur to others skilled in the art upon reading and understanding the specification. The present invention comprises all such equivalents and modifications and is limited only by the scope of the appended claims.

Above, reference has been made to the first scheduling scheme 491, the second scheduling scheme 492, the third scheduling scheme 493, and the fourth scheduling scheme 494. However, generally a larger or smaller number of scheduling schemes may be relied upon.

Further, while above the various scheduling schemes have been described with respect to specific characteristics in terms of frequency re-using and/or co-scheduling, these are examples only and, depending on the specific implementation, different characteristics in terms of frequency re-using and/or co-scheduling may apply.

For example, while above techniques of service-specific allocation of resources have been described with respect to a single cell of a cellular network, generally such techniques may be readily applied to a plurality of cells of the cellular network. Higher-order frequency re-using schemes employing re-using factors of larger than 1 can be employed.

While above the decision criterion for selecting between the various allocation schemes is the level of interference, it should be understood that it is generally possible to consider further decision criteria. E.g., referring to FIGS. 2 and 3, it is possible that also a location of a UE is considered in said selecting.

The invention claimed is:

1. A method of transmitting data on a radio interface of a cellular network, the method comprising:
    in a configuration mode executed prior to a need for transmitting the data on the radio interface:
        receiving at least one configuration message, the at least one configuration message indicating a predetermined first allocation scheme of radio resources on the radio interface, a predetermined second allocation scheme of radio resources on the radio interface, and a service-specific level of interference threshold; and
        storing, in a memory, the first allocation scheme, the second allocation scheme, and the service-specific level of interference threshold;
    based on a service associated with the data, establishing the service-specific level of interference threshold of the service, and further establishing a level of interference value present on the radio interface;
    based on the service-specific level of interference threshold and further based on the level of interference value, selecting between the first allocation scheme and the second allocation scheme; and
    transmitting the data on the radio interface employing radio resources indicated by the selected one of the first allocation scheme and the second allocation scheme.

2. The method of claim 1, wherein the service-specific level of interference threshold comprises a signal-to-noise threshold,
    wherein the establishing of the level of interference value comprises measuring a signal-to-noise value on the radio interface, and
    wherein the selecting between the first allocation scheme and the second allocation scheme comprises executing a threshold comparison between the signal-to-noise threshold and the measured signal-to-noise value, wherein the selecting is based on the threshold comparison.

3. The method of claim 1, further comprising:
    wherein the establishing of the service-specific level of interference threshold comprises retrieving the service-specific level of interference threshold from the memory, and
    wherein the selecting between the first allocation scheme and the second allocation scheme comprises at least partly retrieving the selected one of the first allocation scheme and the second allocation scheme from the memory.

4. The method of claim 1,
    wherein the first allocation scheme co-schedules radio resources on the radio interface for data transmission in a first cell of the cellular network and in a second cell of the cellular network, and
    wherein the second allocation scheme autonomously schedules radio resources on the radio interface for the data transmission in the first cell and in the second cell.

5. The method of claim 4,
    wherein the level of interference value is present on the radio interface at a communication device attached to the cellular network and located in the first cell, and
    wherein the first allocation scheme co-schedules the data transmission of the communication device located in the first cell and the data transmission of a given communication device located in the second cell,
    wherein the method further comprises:
        for a plurality of further communication devices located in the second cell,
        establishing a further level of interference value present on the radio interface at the respective one of the plurality of further communication devices; and
        based on the further level of interference values of the plurality of further communication devices, selecting the given communication device.

6. The method of claim 1, wherein the first allocation scheme allocates a common frequency band to radio resources on the radio interface for the data transmission in a first cell of the cellular network and in a second cell of the cellular network, and
wherein the second allocation scheme allocates at least partly different frequency bands to radio resources on the radio interface for the data transmission in the first cell and the second cell.

7. The method of claim 1,
wherein the selecting comprises selecting between the first allocation scheme, the second allocation scheme, and a predetermined third allocation scheme of radio resources on the radio interface,
wherein the first allocation scheme allocates a common frequency band to radio resources on the radio interface for the data transmission in a first cell of the cellular network and in a second cell of the cellular network,
wherein the second allocation scheme allocates at least partly different frequency bands to radio resources on the radio interface for the data transmission in the first cell and the second cell,
wherein the third allocation scheme allocates a common frequency band to radio resources on the radio interface for the data transmission in the first cell and in the second cell,
wherein the first allocation scheme autonomously schedules radio resources on the radio interface for the data transmission in the first cell and in the second cell,
wherein the second allocation scheme autonomously schedules radio resources on the radio interface for the data transmission in the first cell and in the second cell, and
wherein the third allocation scheme co-schedules radio resources on the radio interface for the data transmission in the first cell and in the second cell.

8. A device, comprising:
an interface circuit configured to transmit data via a radio interface of a cellular network; and
a processing circuit operatively associated with the interface circuit and configured to:
in a configuration mode executed prior to a need to transmit the data on the radio interface, receive at least one configuration message, the at least one configuration message indicating a predetermined first allocation scheme of radio resources on the radio interface, a predetermined second allocation scheme of the radio resources on the radio interface, and a service-specific level of interference threshold;
store, in a memory of the device, the first allocation scheme, the second allocation scheme, and the service-specific level of interference threshold;
establish, based on a service associated with the data, the service-specific level of interference threshold of the service, and establish a level of interference value present on the radio interface;
select between the first allocation scheme and the second allocation scheme, based on the service-specific level of interference threshold and the level of interference value; and
transmit the data on the radio interface employing radio resources indicated by the selected one of the first allocation scheme and the second allocation scheme.

9. The device of claim 8, wherein the device is one of: a communication device attached to the cellular network via the radio interface; and a scheduler of the cellular network.

10. The device of claim 8,
wherein the level of interference threshold comprises a signal-to-noise threshold, and wherein the processing circuit is configured to:
establish the level of interference value by measuring a signal-to-noise value on the radio interface; and
select between the first allocation scheme and the second allocation scheme by executing a threshold comparison between the signal-to-noise threshold and the measured signal-to-noise value, based on the threshold comparison.

11. The device of claim 8, wherein the processing circuit is configured to:
establish the service-specific level of interference threshold by retrieving the service-specific level of interference threshold from the memory; and
select between the first allocation scheme and the second allocation scheme by at least partly retrieving the selected one of the first allocation scheme and the second allocation scheme from the memory.

12. The device of claim 8,
wherein the first allocation scheme co-schedules radio resources on the radio interface for data transmission in a first cell of the cellular network and in a second cell of the cellular network, and
wherein the second allocation scheme autonomously schedules radio resources on the radio interface for the data transmission in the first cell and in the second cell.

13. The method of claim 12,
wherein the level of interference value is present on the radio interface at a communication device attached to the cellular network and located in the first cell,
wherein the first allocation scheme co-schedules the data transmission of the communication device located in the first cell and the data transmission of a given communication device located in the second cell, and
wherein the processing circuit is configured to: for each of a plurality of further communication devices located in the second cell:
establish a further level of interference value present on the radio interface at the respective one of the plurality of further communication devices; and
based on the established further level of interference values of the plurality of further communication devices, select the given communication device.

14. The device of claim 8,
wherein the first allocation scheme allocates a common frequency band to radio resources on the radio interface for the data transmission in a first cell of the cellular network and in a second cell of the cellular network, and
wherein the second allocation scheme allocates at least partly different frequency bands to radio resources on the radio interface for the data transmission in the first cell and the second cell.

15. The method of claim 8,
wherein the processing circuit is configured to select between the first allocation scheme, the second allocation scheme, and a predetermined third allocation scheme of radio resources on the radio interface,
wherein the first allocation scheme allocates a common frequency band to radio resources on the radio interface for the data transmission in a first cell of the cellular network and in a second cell of the cellular network,
wherein the second allocation scheme allocates at least partly different frequency bands to radio resources on the radio interface for the data transmission in the first cell and the second cell, wherein the third allocation scheme allocates a common frequency band to radio resources on the radio interface for the data transmission in the first cell and in the second cell,
wherein the first allocation scheme autonomously schedules radio resources on the radio interface for the data transmission in the first cell and in the second cell,
wherein the second allocation scheme autonomously schedules radio resources on the radio interface for the data transmission in the first cell and in the second cell, and
wherein the third allocation scheme co-schedules radio resources on the radio interface for the data transmission in the first cell and in the second cell.

16. A method of resource allocation, the method comprising for each one of a plurality of services for which data transmission on a radio interface of a cellular network is available:
determining a first allocation scheme of radio resources on the radio interface and a second allocation scheme of radio resources on the radio interface, the first allocation scheme re-using radio resources on the radio interface between a first cell and a second cell of the cellular network,
wherein the determining of the first allocation schemes and of the second allocation schemes and of a level of interference and of a service-specific level of interference thresholds is part of a configuration mode being executed prior to a need for transmitting of data on the radio interface and further comprises sending, to a communication device located in the first cell, at least one configuration message, the at least one configuration message indicating the first allocation scheme, the second allocation scheme, and the service-specific level of interference threshold associated with at least one of the plurality of services;
for at least one of the first allocation scheme and the second allocation scheme, determining a level of interference value between the first cell and the second cell; and
based on the level of interference value and a service-specific quality of service requirement of the respective service, determining a service-specific level of interference threshold of the respective service, the service-specific level of interference threshold being suited to be used as a decision criterion for selecting between the first allocation scheme and the second allocation scheme prior to enabling transmission of data of the respective service on the radio interface.

17. The method of claim 16,
wherein the first allocation scheme of a given one of the plurality of services allocates a common frequency band to radio resources on the radio interface for the data transmission in the first cell and the second cell, and
wherein the second allocation scheme of a given one of the plurality of services allocates at least partly different frequency bands to radio resources on the radio interface for the data transmission in the first cell and the second cell.

18. The method of claim 16, wherein the level of interference value is determined based on a model-based performance metric yielding a distribution of signal-to-noise values for different locations at least in the first cell, the model-based performance metric considering a spatial geometry of the first cell and the second cell.

19. A device, comprising:
an interface circuit configured to transmit data via a radio interface of a cellular network; and
a processing circuit operatively associated with the interface circuit and configured to, for each one of a plurality of services for which data transmission on the radio interface is available:
determine a first allocation scheme of radio resources on the radio interface and a second allocation scheme of radio resources on the radio interface, the first allocation scheme re-using radio resources on the radio interface between a first cell and a second cell of the cellular network,
wherein the determining of the first allocation schemes and of the second allocation schemes and of a level of interference and of a service-specific level of interference thresholds is part of a configuration mode being executed prior to a need to transmit the data on the radio interface and wherein the processing circuit is configured to send, to a communication device located in the first cell, at least one configuration message, the at least one configuration message indicating the first allocation scheme, the second allocation scheme, and the service-specific level of interference threshold associated with at least one of the plurality of services;
for at least one of the first allocation scheme and the second allocation scheme, determine a level of interference value between the first cell and the second cell; and
based on the determined level of interference value and a service-specific quality of service requirement of the respective service, determine a service-specific level of interference threshold of the respective service, the service-specific level of interference threshold being suited to be used as a decision criterion for selecting between the first allocation scheme and the second allocation scheme prior to enabling transmission of data of the respective service on the radio interface.

20. The device of claim 19,
wherein the first allocation scheme of a given one of the plurality of services allocates a common frequency band to radio resources on the radio interface for the data transmission in the first cell and the second cell, and
wherein the second allocation scheme of a given one of the plurality of services allocates at least partly different frequency bands to radio resources on the radio interface for the data transmission in the first cell and the second cell.

21. The device of claim 19, wherein the level of interference value is determined based on a model-based performance metric yielding a distribution of signal-to-noise values for different locations at least in the first cell, the model-based performance metric considering a spatial geometry of the first cell and the second cell.

* * * * *